US010884280B2

(12) United States Patent
Ono

(10) Patent No.: US 10,884,280 B2
(45) Date of Patent: Jan. 5, 2021

(54) LIQUID CRYSTAL DISPLAY DEVICE

(71) Applicants: Panasonic Liquid Crystal Display Co., Ltd., Himeji (JP); Pasona Knowledge Partner Inc., Osaka (JP)

(72) Inventor: Kikuo Ono, Ibaraki (JP)

(73) Assignees: Panasonic Liquid Crystal Display Co., Ltd., Hyogo (JP); Pasona Knowledge Partner Inc., Osaka (JP)

(*) Notice: Subject to any disclaimer, the term of this patent is extended or adjusted under 35 U.S.C. 154(b) by 0 days.

(21) Appl. No.: 16/168,394

(22) Filed: Oct. 23, 2018

(65) Prior Publication Data

US 2019/0121193 A1 Apr. 25, 2019

(30) Foreign Application Priority Data

Oct. 25, 2017 (JP) .................. 2017-205910

(51) Int. Cl.
*G02F 1/1335* (2006.01)
*G02F 1/017* (2006.01)
(Continued)

(52) U.S. Cl.
CPC ........ *G02F 1/133512* (2013.01); *G02F 1/017* (2013.01); *G02F 1/1335* (2013.01); *G02F 1/133514* (2013.01); *G02F 1/133528* (2013.01); *G02F 1/133603* (2013.01); *G02F 1/134363* (2013.01); *G02F 2001/01791* (2013.01);
(Continued)

(58) Field of Classification Search
CPC ............... G02F 1/133514; G02F 1/017; G02F 1/133528; G02F 1/134363; G02F 1/133603; G02F 1/133512; G02F 2201/123; G02F 2201/121; G02F 2001/01791; G02F 2001/133519; G02F 1/136209; G02F 1/13473; G02F 1/133371; G02F 2001/136222; G02F 2001/136218; G02F 1/133617; G02F 2001/133614; G02F 2201/44; G09G 3/3688; G09G 2310/08;
(Continued)

(56) References Cited

U.S. PATENT DOCUMENTS 9,498,938 B2   11/2016  Son et al.
9,703,191 B2    7/2017  Park et al.
(Continued)

FOREIGN PATENT DOCUMENTS

EP    1 061 402    12/2000
JP     3968208     6/2007
(Continued)

*Primary Examiner* — Shan Liu
(74) *Attorney, Agent, or Firm* — Hamre, Schumann, Mueller & Larson, P.C.

(57) ABSTRACT

A liquid crystal display device comprising; a first display panel including a first substrate, a second substrate that is disposed in a first direction with respect to the first substrate and includes a color filter, and a first liquid crystal layer disposed between the first substrate and the second substrate; a color conversion unit disposed in a second direction opposite to the first direction with respect to the first display panel; and a backlight disposed in the second direction with respect to the color conversion unit. The color conversion unit converts backlight light emitted from the backlight into light of a color corresponding to the color filter, and emits the light.

10 Claims, 24 Drawing Sheets

(51) Int. Cl.
  *G02F 1/13357* (2006.01)
  *G02F 1/1343* (2006.01)
(52) U.S. Cl.
  CPC ............ *G02F 2001/133519* (2013.01); *G02F 2201/121* (2013.01); *G02F 2201/123* (2013.01)
(58) Field of Classification Search
  CPC ... H01L 27/124; H01J 11/44; H01J 2211/444; H01J 2329/323; H01J 29/327
  USPC ...................................... 349/106–111, 69–71
  See application file for complete search history.

(56) References Cited

U.S. PATENT DOCUMENTS

| | | | |
|---|---|---|---|
| 2009/0053430 A1* | 2/2009 | Matsumori | G02F 1/133723 428/1.25 |
| 2009/0115713 A1* | 5/2009 | Kakinuma | G09G 3/3611 345/88 |
| 2009/0147186 A1* | 6/2009 | Nakai | G02F 1/13471 349/74 |
| 2012/0154464 A1* | 6/2012 | Ninan | G09G 3/02 345/691 |
| 2014/0043566 A1* | 2/2014 | Lee | G02F 1/133617 349/71 |
| 2015/0041302 A1 | 2/2015 | Okumura et al. | |
| 2015/0042933 A1* | 2/2015 | Ueki | G02F 1/133621 349/108 |
| 2016/0116801 A1* | 4/2016 | Fan | G02F 1/133617 349/71 |
| 2016/0306215 A1* | 10/2016 | Chen | G02F 1/133514 |
| 2017/0225385 A1 | 8/2017 | Park et al. | |
| 2018/0045866 A1* | 2/2018 | Chae | G02B 5/207 |
| 2018/0088261 A1* | 3/2018 | Song | G02F 1/133512 |
| 2018/0088344 A1* | 3/2018 | Yang | G02F 1/133514 |
| 2018/0224701 A1* | 8/2018 | Shin | G02F 1/133621 |

FOREIGN PATENT DOCUMENTS

| | | |
|---|---|---|
| JP | 5663115 | 2/2015 |
| JP | 5911029 | 4/2016 |

* cited by examiner

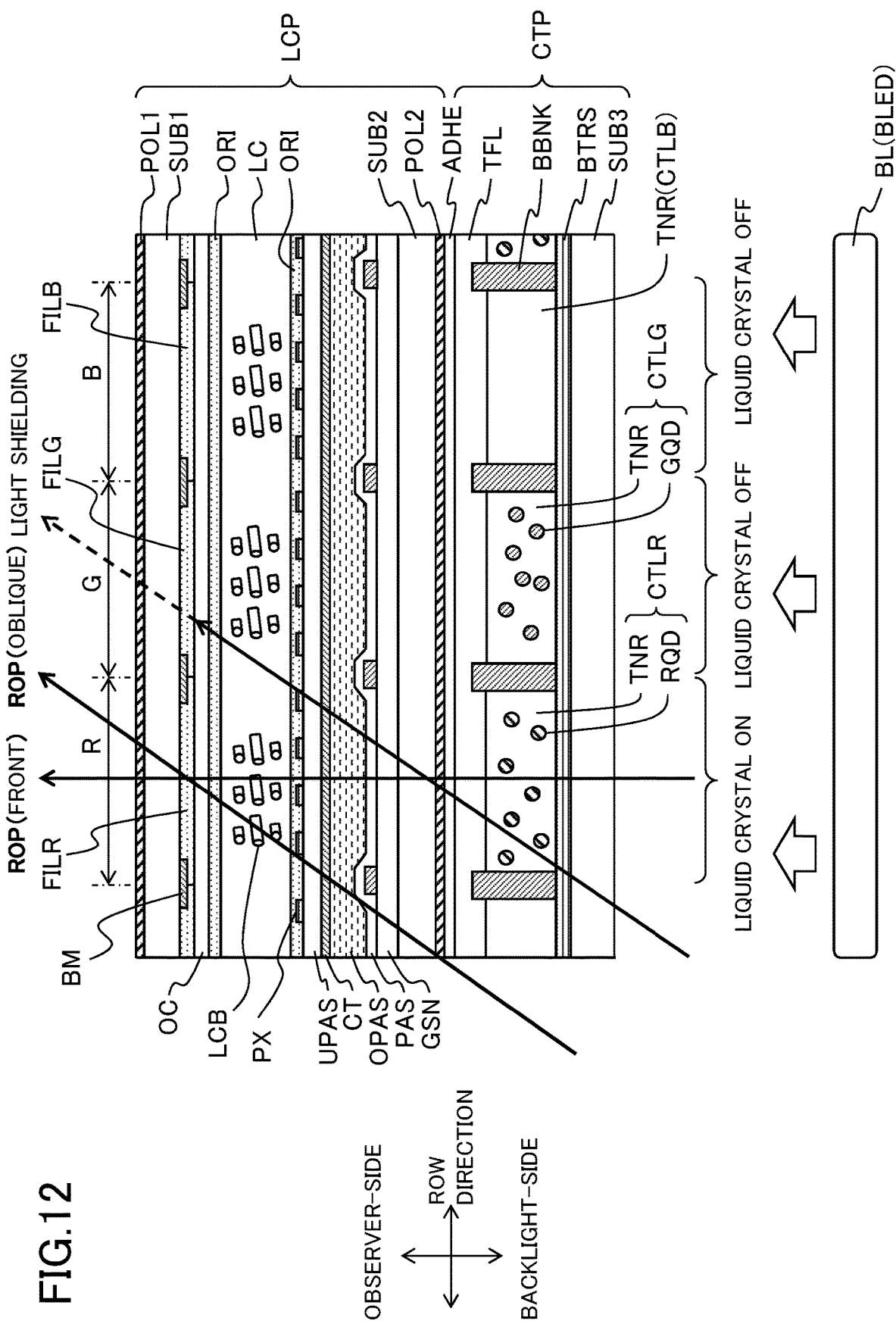

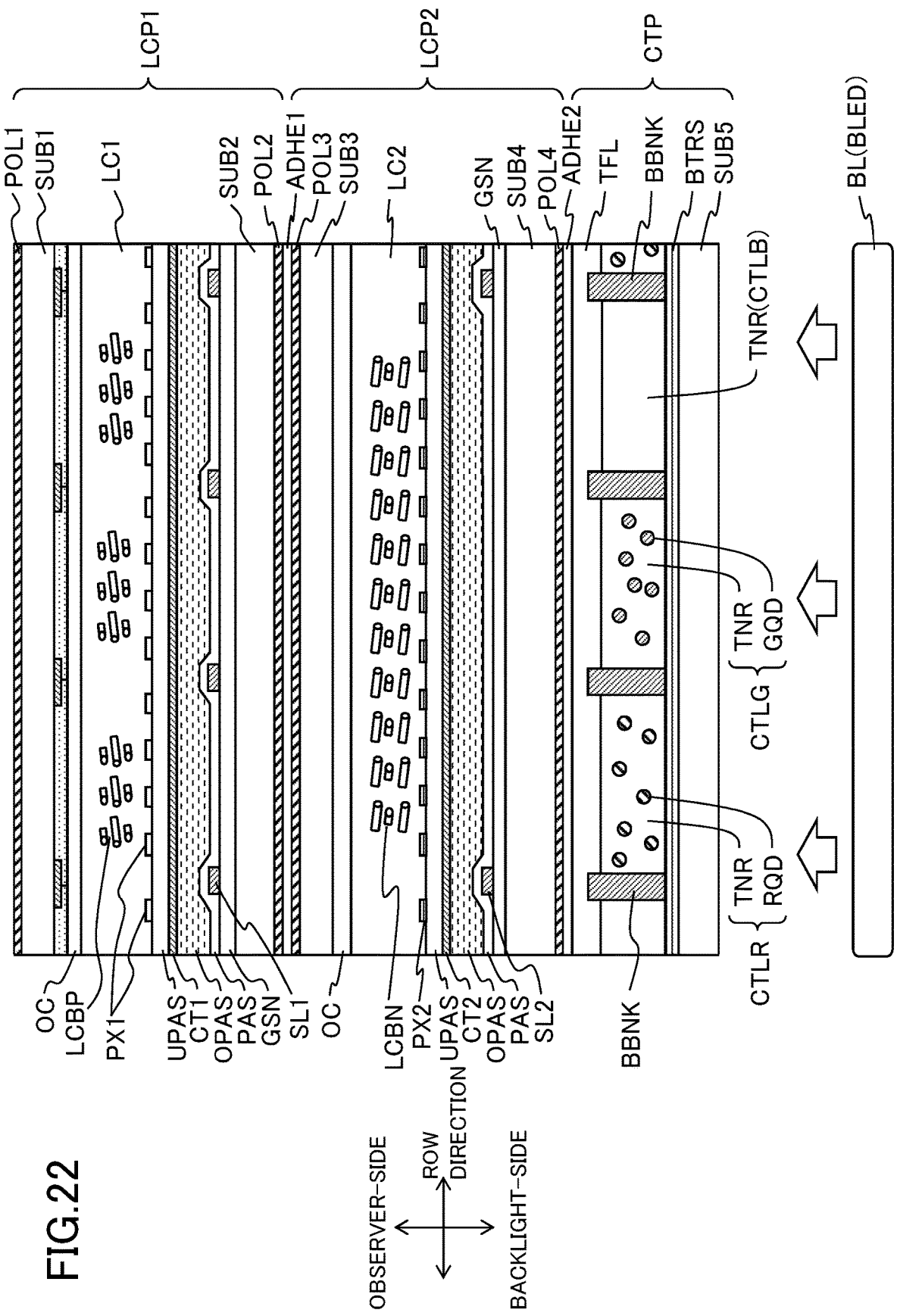

LIQUID CRYSTAL DISPLAY DEVICE

CROSS-REFERENCE TO RELATED APPLICATION

The present application claims priority from Japanese application JP 2017-205910 filed on Oct. 25, 2017, the content of which is hereby incorporated by reference into this application.

TECHNICAL FIELD

The present invention relates to a liquid crystal display device.

BACKGROUND

Conventionally, in liquid crystal display devices, as a technique of enlarging a color gamut, a liquid crystal display device including a color conversion layer containing quantum dots was proposed. The color conversion layer converts light emitted from a backlight into, for example, a wavelength responsive to a particle size of a quantum dot, thereby converting into light of another color. For example, a prior art discloses a liquid crystal display device that displays an image in such a manner that color conversion layers (a red color conversion layer and a green color conversion layer) disposed immediately below color filters respectively convert light (blue light) from a backlight into red light and green light (See, for example, U.S. Pat. No. 9,703,191).

However, the above-described liquid crystal display device has the following problem. Specifically, the light (blue light) from the backlight passes through a liquid crystal layer in an ON state. Therefore, in a case of displaying, for example, a red image, the red light passing through the red color conversion layer and the red color filter from the liquid crystal layer in the ON state and the green light passing through the green color conversion layer and the green color filter from the liquid crystal layer in the ON state cause color mixing (also referred to as oblique color mixing or viewing angle color mixing) when a display screen is seen obliquely.

The present invention has been made in view of the above-described circumstances, and an object thereof is to provide a liquid crystal display device capable of reducing oblique color mixing.

SUMMARY

In one general aspect, the instant application includes a liquid crystal display device including: a first display panel including a first substrate, a second substrate that is disposed in a first direction with respect to the first substrate and includes a color filter, and a first liquid crystal layer disposed between the first substrate and the second substrate; a color conversion unit disposed in a second direction opposite to the first direction with respect to the first display panel; and a backlight disposed in the second direction with respect to the color conversion unit. The color conversion unit converts backlight light emitted from the backlight into light of a color corresponding to the color filter, and emits the light.

The above general aspect may include one or more of the following features. The color filter may include a first color filter of a first color and a second color filter of a second color. The color conversion unit may include: a first color conversion layer that converts the backlight light into light of the first color; a second color conversion layer that converts the backlight light into light of the second color; a light shielding unit that is disposed at a boundary between the first color conversion layer and the second color conversion layer and blocks transmission of light; and a bandpass filter disposed in the second direction with respect to the first color conversion layer, the second color conversion layer, and the light shielding unit, the band pass filter having a property of transmitting the backlight light and of reflecting the light of the first color and the light of the second color.

Each of the first color conversion layer and the second color conversion layer may include quantum dots having different diameters from each other.

The backlight may emit blue light, and the first color conversion layer may convert the blue light into red light, and the second color conversion layer may convert the blue light into green light.

The backlight may emit blue light. The color conversion unit may include a red conversion layer that converts a blue light into a red light and a green conversion layer that converts the blue light into a green light, and the color filter includes a red color filter and a green color filter.

A polarizing plate may be disposed between the color conversion unit and the first display panel.

The first display panel may be an IPS type liquid crystal display panel.

The liquid crystal display device may further comprising a second display panel disposed between the first display panel and the color conversion unit. The first display panel may display a color image and the second display panel may display a black-and-white image.

The first display panel and the second display panel may be an IPS type liquid crystal display panel.

A liquid crystal display device according to the present invention is capable of reducing oblique color mixing.

BRIEF DESCRIPTION OF THE DRAWINGS

FIG. 12 illustrates a sectional view of liquid crystal display device in order to explain an effect of the liquid crystal display device;

FIG. 22 is a sectional view taken along line 22-22' in FIGS. 21A and 21B;

DETAILED DESCRIPTION

Exemplary embodiments of the present invention will be described below with reference to the accompanying drawings. A liquid crystal display device according to the present invention includes, for example, a display panel for displaying an image, a drive circuit (e.g., a source driver, a gate driver) for driving the display panel, a timing controller for controlling the drive circuit, an image processor for performing image processing on an input video signal received from the outside and outputting image data to the timing controller, a backlight disposed on a back surface side of the display panel, and a color conversion panel (a color converter) for converting light (e.g., blue LED light) emitted from the backlight into light of a desired color and emitting the converted light to the display panel. The number of display panels is not particularly limited. One display panel may be provided or a plurality of display panels may be provided. In a first exemplary embodiment, a liquid crystal display device LCD including one display panel is exemplified. In a second exemplary embodiment, a liquid crystal display device LCD including two display panels is exemplified.

First Exemplary Embodiment

Figure 1:
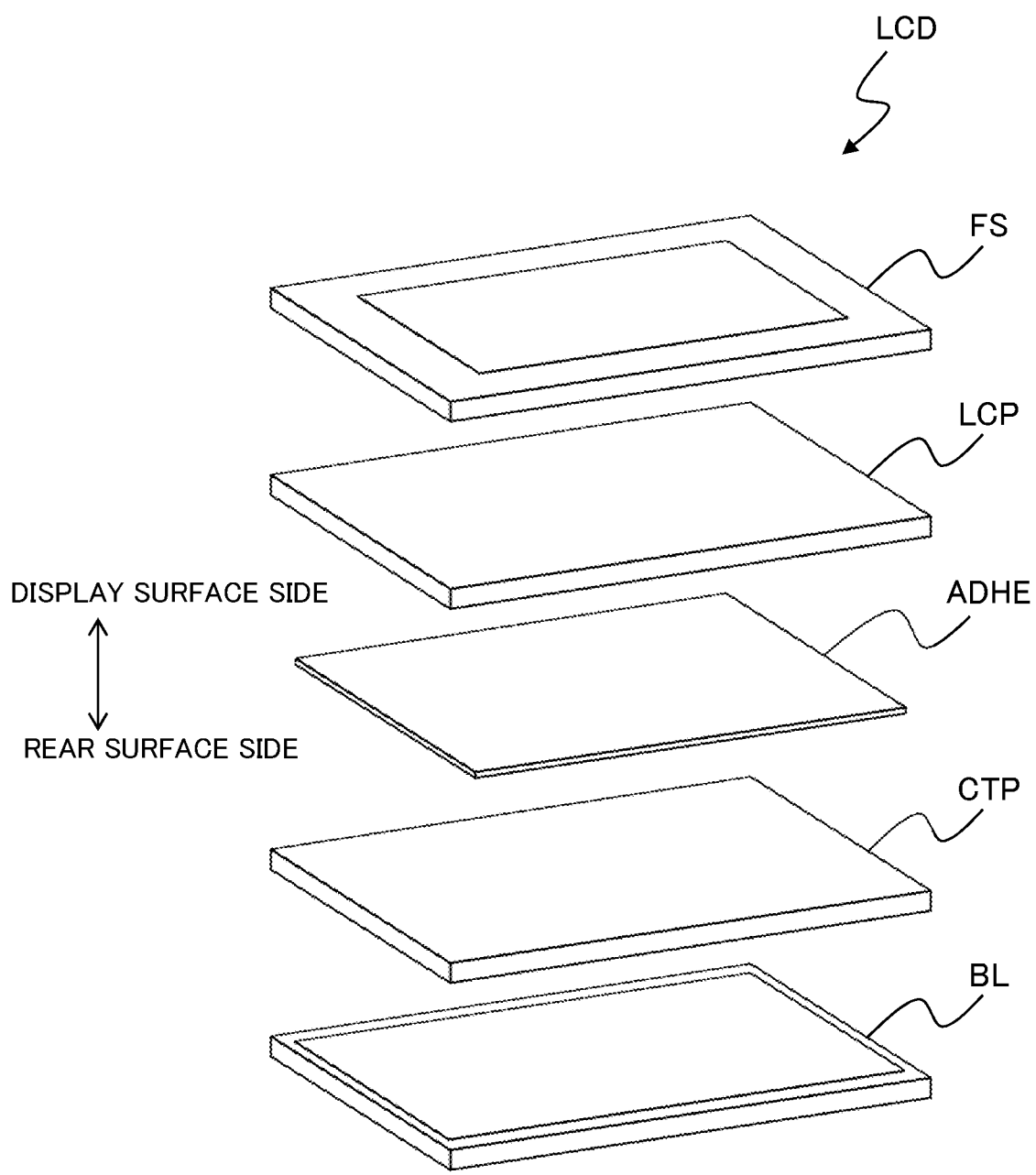
FIG. 1 is an exploded perspective view illustrating a schematic configuration of a liquid crystal display device according to a first exemplary embodiment.

FIG. 1 is an exploded perspective view illustrating a schematic configuration of a liquid crystal display device LCD according to a first exemplary embodiment. As illustrated in FIG. 1, liquid crystal display device LCD includes a display panel LCP disposed at a position (display surface side: first direction) closer to an observer, a color conversion panel CTP disposed at a position (back surface side: second direction) farther from the observer than display panel LCP is, an adhesive ADHE (adhesive layer) for bonding display panel LCP and color conversion panel CTP together, a backlight BL disposed on the back surface side of color conversion panel CTP, and a front chassis FS covering display panel LCP and color conversion panel CTP from the display surface side.

Figure 2:
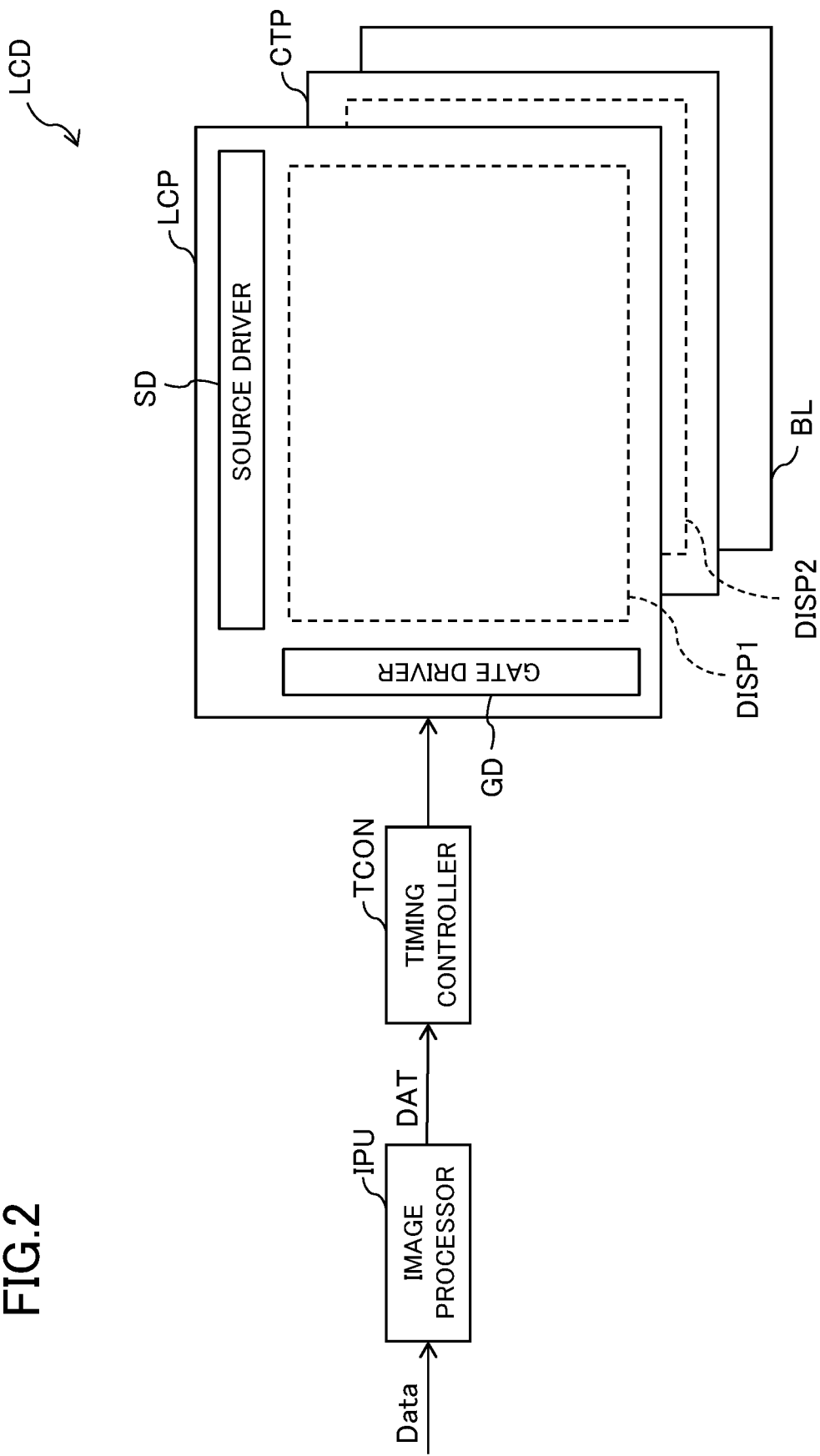
FIG. 2 is a block diagram schematically illustrating a schematic configuration of liquid crystal display device according to the first exemplary embodiment.

FIG. 2 is a block diagram schematically illustrating a schematic configuration of liquid crystal display device LCD according to the first exemplary embodiment. As illustrated in FIG. 2, display panel LCP includes a source driver SD and a gate driver GD. Liquid crystal display device LCD also includes a timing controller TCON for controlling source driver SD and gate driver GD, and image processor IPU for outputting image data to timing controller TCON. Image processor IPU receives input video signal Data transmitted from an external system (not illustrated) and, after performing known image processing, outputs image data DAT to timing controller TCON. Image processor IPU also outputs a control signal such as a synchronizing signal (omitted in FIG. 2) to timing controller TCON. Display panel LCP displays an image responsive to input video signal Data on a display region DISP1.

Backlight BL includes, for example, a light emitting diode (LED) as a light source. The light source may be disposed beside a light guide plate included in backlight BL or may be disposed immediately below display panel LCP. In the present exemplary embodiment, a configuration in which a blue LED whose wavelength peak is around 450 nm is used and backlight BL emits blue light is described as an example of the light source.

Between display panel LCP and backlight BL, color conversion panel CTP is disposed. Color conversion panel CTP converts light (blue light) emitted from backlight BL into light of another color (here, red light and green light) and emits the converted light to display panel LCP. That is, color conversion panel CTP outputs red light, green light, and blue light to a display region DISP2.

Figure 3:
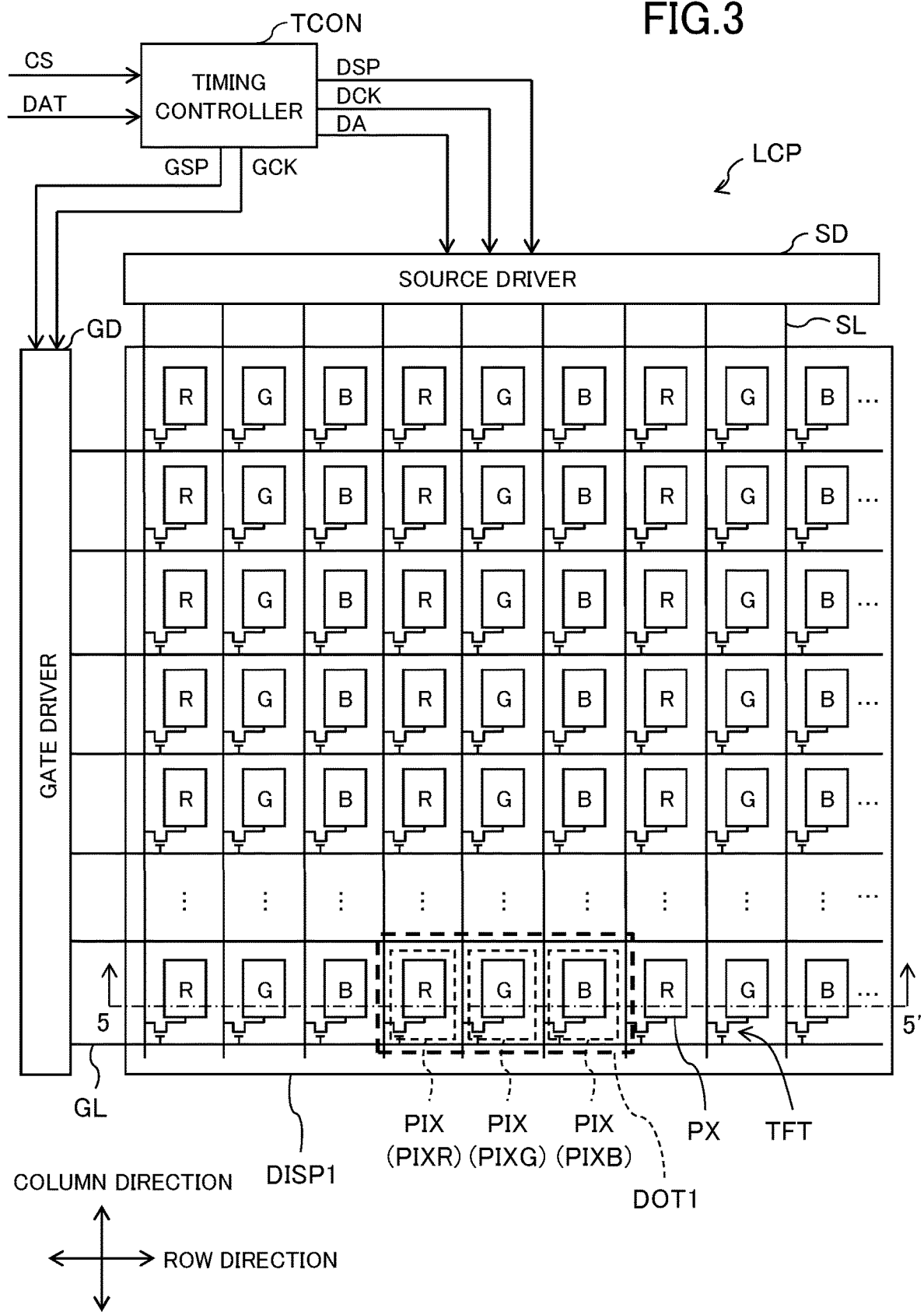
FIG. 3 is a plan view illustrating a schematic configuration of display panel according to the first exemplary embodiment.
Figure 4:
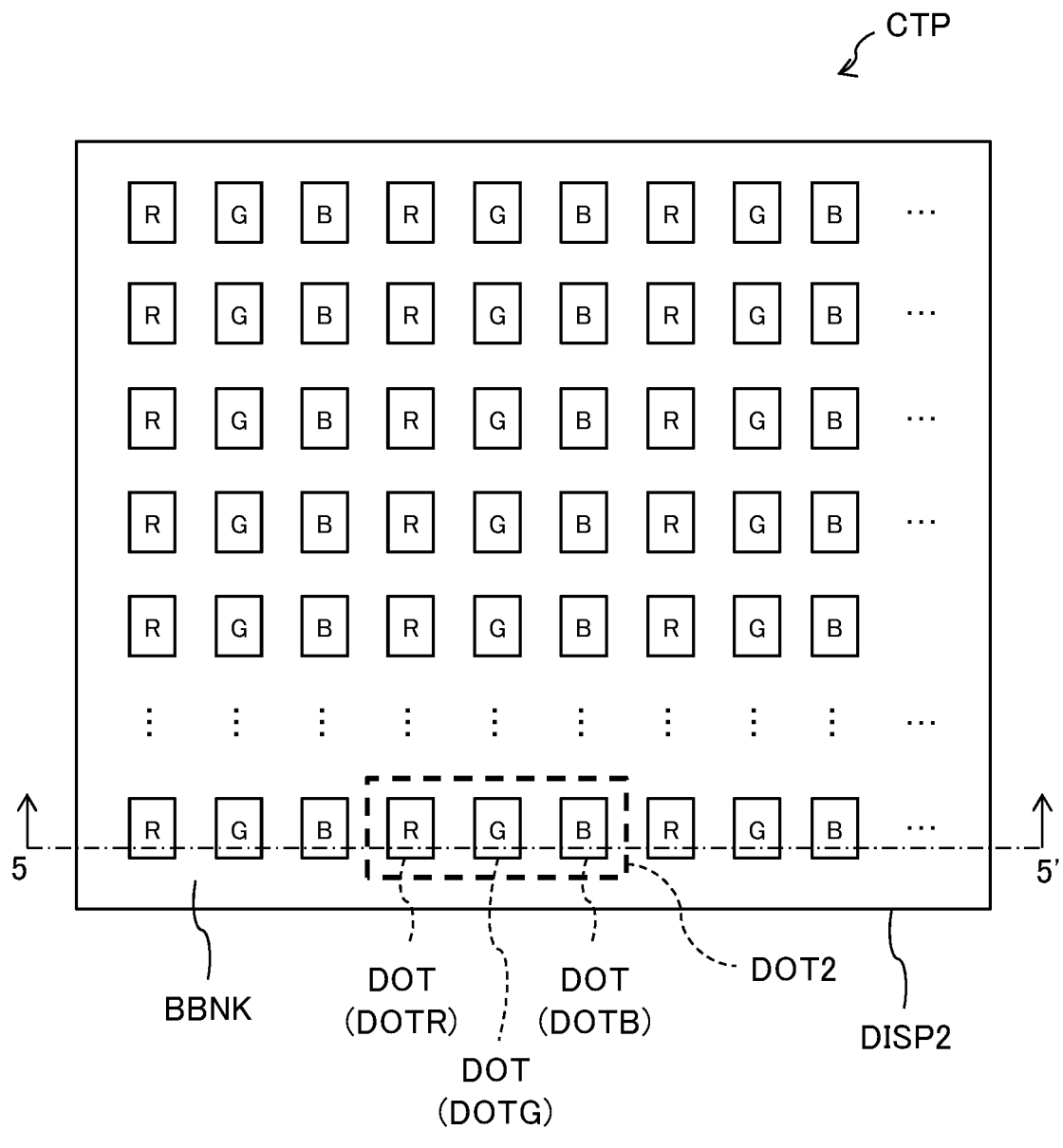
FIG. 4 is a plan view schematically illustrating a schematic configuration of color conversion panel CTP according to the first exemplary embodiment.
Figure 5:
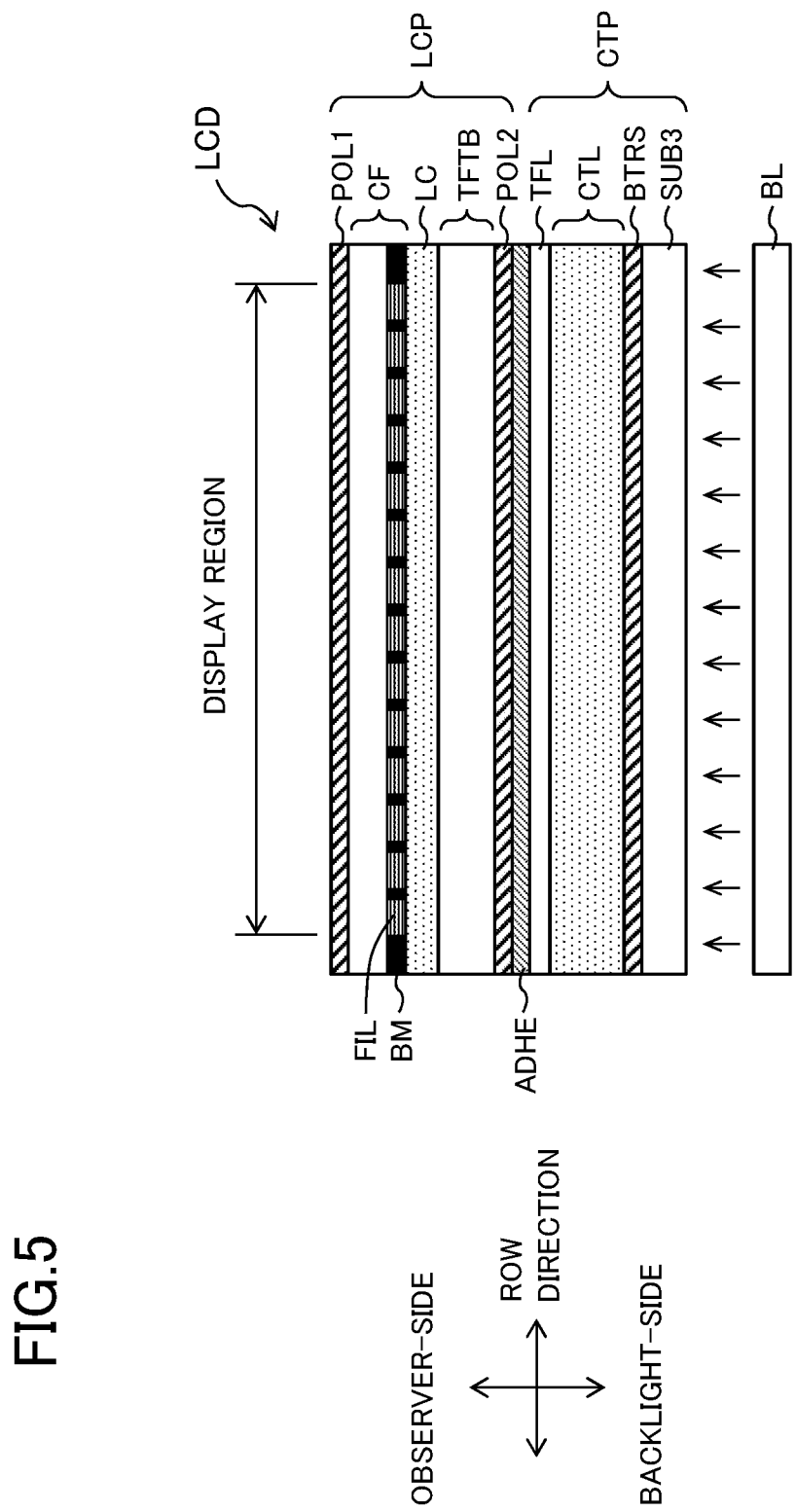
FIG. 5 is a sectional view taken along line 5-5' in FIGS. 3 and 4.

FIG. 3 is a plan view illustrating a schematic configuration of display panel LCP according to the first exemplary embodiment, and FIG. 4 is a plan view schematically illustrating a schematic configuration of color conversion panel CTP according to the first exemplary embodiment. FIG. 5 is a sectional view taken along line 5-5' in FIGS. 3 and 4.

With reference to FIGS. 3 and 5, the schematic configuration of display panel LCP is described. As illustrated in FIG. 5, display panel LCP includes a thin film transistor substrate TFTB disposed on the backlight BL side (second direction), a counter substrate CF disposed on the observer side (first direction) so as to face thin film transistor substrate TFTB, and a liquid crystal layer LC disposed between thin film transistor substrate TFTB and counter substrate CF. A polarizing plate POL1 is disposed on the observer side of display panel LCP, and a polarizing plate POL2 is disposed on the backlight BL side.

As illustrated in FIG. 3, thin film transistor substrate TFTB has, formed thereon, a plurality of source lines SL extending in the column direction, a plurality of gate lines GL extending in the row direction, and thin film transistors TFT respectively formed in the vicinity of intersections between source lines SL and gate lines GL. A pixel PIX is defined by adjoining two of source lines SL and adjoining two of gate lines GL in plan view, and pixels PIX are arranged in a matrix form (in the row direction and the column direction). Source lines SL are arranged at equal intervals in the row direction, and gate lines GL are arranged at equal intervals in the column direction. In thin film transistor substrate TFTB, a pixel electrode PX is formed for each pixel PIX, and one common electrode CT (see, for example, FIG. 8) common to the pixels PIX is formed. A source electrode (not illustrated) which constitutes thin film transistor TFT is electrically connected to source line SL, a drain electrode DD (see, for example, FIG. 8) is electrically connected to pixel electrode PX via a contact hole CONT (see, for example, FIG. 8), and a gate electrode (not illustrated) is electrically connected to gate line GL.

As illustrated in FIG. 5, counter substrate CF has, formed thereon, a light transmission part allowing transmission of light, and black matrix BM (light blocking part) for blocking transmission of light. The light transmission part includes a plurality of color filters FIL (colored layers) corresponding to pixels PIX. The light transmission part is surrounded with black matrix BM and is formed in, for example, a rectangular shape. Color filters FIL include red color filters FILR (red color layer) made of a red (R color) material and allowing transmission of red light, green color filters FILG (green color layer) made of a green (G color) material and allowing transmission of green light, and blue color filters FILB (blue color layer) made of a blue (B color) material and allowing transmission of blue light. Red color filters FILR, green color filters FILG, and blue color filters FILB are repeatedly arrayed in this order in the row direction. Color filters FIL that are the same in color as each other are arrayed in the column direction. Black matrix BM is formed in a boundary portion between adjoining two of color filters FIL in the row and column directions. In correspondence with color filters FIL, pixels PIX include, as illustrated in FIG. 3, red pixels PIXR corresponding to red color filters FILR, green pixels PIXG corresponding to green color filters FILG, and blue pixels PIXB corresponding to blue color filters FILB. On display panel LCP, red pixels PIXR, green pixels PIXG, and blue pixels PIXB are repeatedly arrayed in this order in the row direction, and pixels PIX that are the same in color as each other are arrayed in the column direction. In addition, red pixel PIXR, green pixel PIXG, and blue pixel PIXB constitute one display dot DOT1.

Timing controller TCON has a configuration known in the art. For example, timing controller TCON generates image data DA as well as various timing signals (data start pulse DSP, data clock DCK, gate start pulse GSP, gate clock GCK) for controlling the driving of source driver SD and gate driver GD, based on image data DAT and a control signal CS (e.g., a clock signal, a vertical synchronizing signal, a horizontal synchronizing signal) output from image processor IPU (see FIG. 3). Timing controller TCON outputs image data DA, data start pulse DSP, and data clock DCK to source driver SD. Timing controller TCON also outputs gate start pulse GSP and gate clock GCK to gate driver GD.

Source driver SD outputs a data signal (data voltage) responsive to image data DA to source line SL, based on data start pulse DSP and data clock DCK. Gate driver GD outputs a gate signal (gate voltage) to gate line GL, based on gate start pulse GSP and gate clock GCK.

To each source line SL, a data voltage is supplied from source driver SD. To each gate line GL, a gate voltage is supplied from gate driver GD. To common electrode CT, a common voltage Vcom is supplied from a common driver (not illustrated). When the gate voltage (gate-on voltage) is supplied to gate lines GL, thin film transistors TFT connected to gate lines GL are turned on, and the data voltage is supplied to pixel electrodes PX through source lines SL connected to thin film transistors TFT. An electric field is generated by a difference between the data voltage supplied to pixel electrodes PX and common voltage Vcom supplied to common electrode CT. An image is displayed by driving liquid crystal molecules LCB (see FIG. 8) using this electric field, and controlling the transmittance of light emitted from backlight BL and color conversion panel CTP. In display panel LCP, a color image is displayed by supplying a desired data voltage to source lines SL connected to pixel electrodes PX including red pixels PIXR, green pixels PIXG, and blue pixels PIXB.

Next, the configuration of color conversion panel CTP will be described with reference to FIGS. 4 and 5. As illustrated in FIG. 5, color conversion panel CTP includes a transparent substrate SUB3 disposed on the backlight BL side (second direction), a band-pass filter BTRS formed on transparent substrate SUB3, a color conversion layer CTL formed on band-pass filter BTRS, and a transparent protective film TFL formed on color conversion layer CTL. In color conversion panel CTP, in plan view, light blocking parts BBNK (black light blocking banks) for blocking transmission of light are formed at equal intervals in the row direction and the column direction, and opening regions (color dots DOT) respectively surrounded with light blocking parts BBNK are arranged in a matrix form in correspondence with pixels PIX of display panel LCP. That is, in plan view, red dots DOTR illustrated in FIG. 4 overlap with red pixels PIXR illustrated in FIG. 3, green dots DOTG illustrated in FIG. 4 overlap with green pixels PIXG illustrated in FIG. 3, and blue dots DOTB illustrated in FIG. 4 overlap with blue pixels PIXB illustrated in FIG. 3. In addition, red dot DOTR, green dot DOTG, and blue dot DOTB constitute one display dot DOT2. Adhesive ADHE is disposed between polarizing plate POL2 of display panel LCP and transparent protective film TFL of color conversion panel CTP to thereby fix display panel LCP and color conversion panel CTP to each other by adhesion.

Figure 6A:
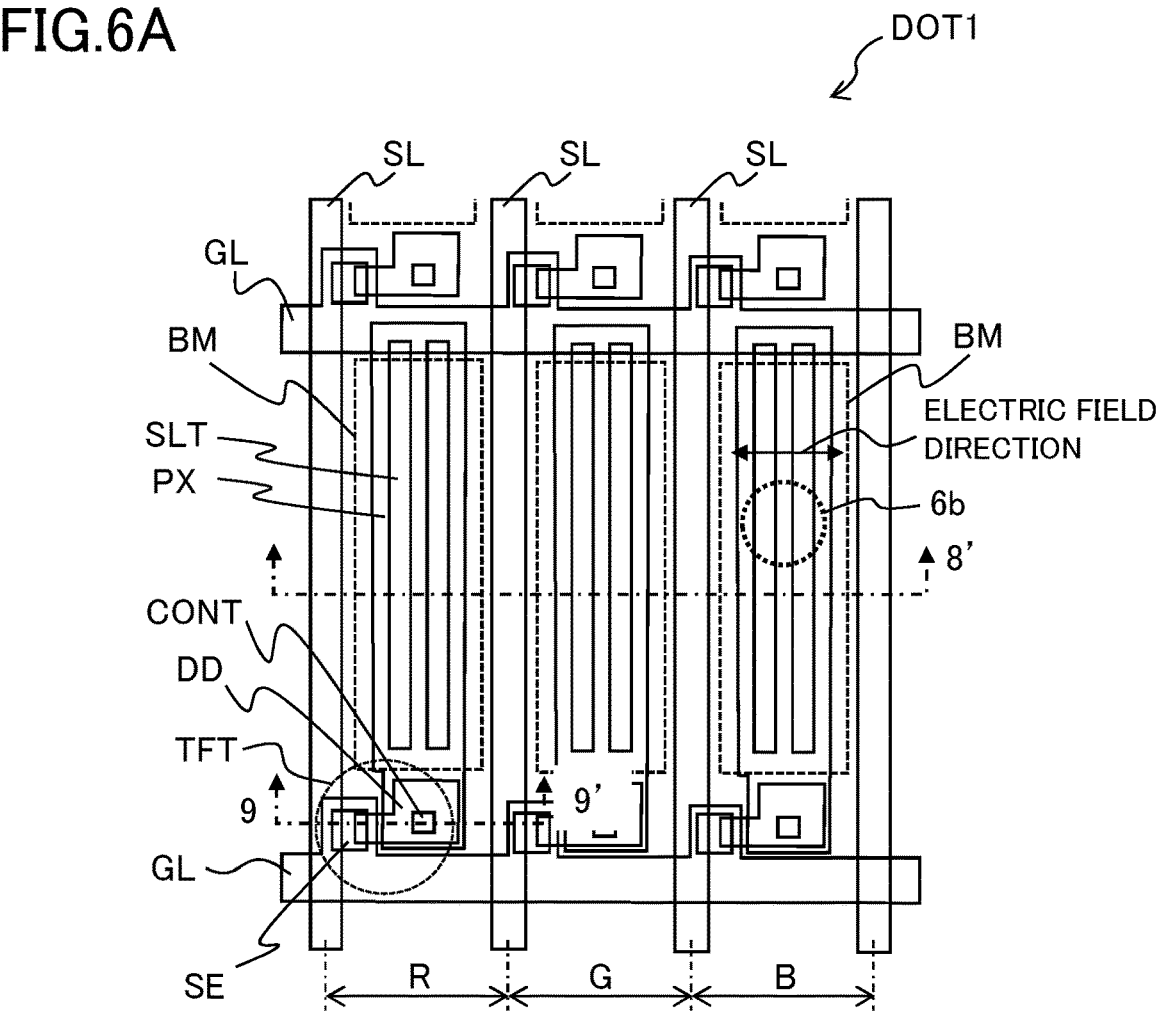
FIGS. 6A and 6B are plan views illustrating a specific configuration of display dot of display panel according to the first exemplary embodiment.
Figure 7:
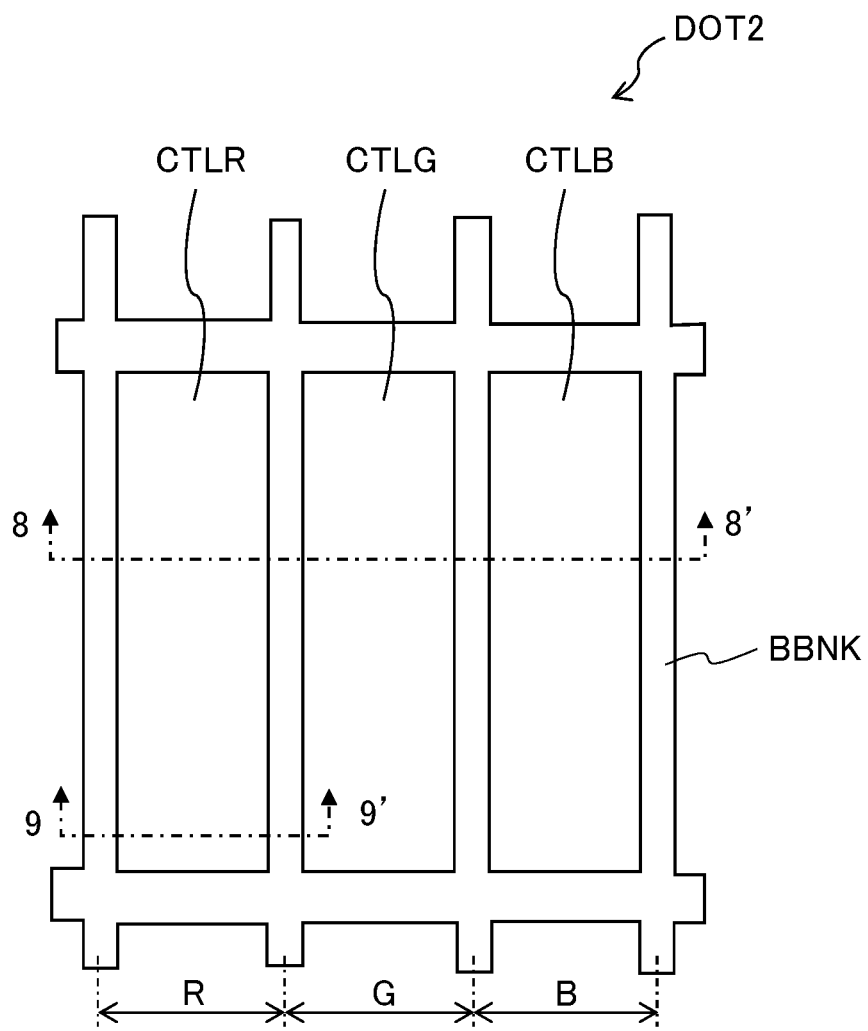
FIG. 7 is a plan view illustrating a specific configuration of display dot of color conversion panel according to the first exemplary embodiment.

FIG. 6A is a plan view illustrating a specific configuration of display dot DOT1 of display panel LCP according to the first exemplary embodiment, and FIG. 7 is a plan view illustrating a specific configuration of display dot DOT2 of color conversion panel CTP according to the first exemplary embodiment. As illustrated in FIG. 6A, slits SLT may be formed in pixel electrode PX. FIG. 6A illustrates a semiconductor layer SE and a drain electrode DD which constitute thin film transistor TFT. As illustrated in FIG. 7, color conversion layers CTL are formed in the opening regions (color dots DOT) surrounded with light blocking parts BBNK. More specifically, red color conversion layer CTLR is formed in red dot DOTR, green color conversion layer CTLG is formed in green dot DOTG, and blue color conversion layer CTLB is formed in blue dot DOTB. As seen in planar view, black matrix BM (see FIG. 6A) of display panel LCP and light blocking part BBNK (see FIG. 7) of color conversion panel CTP are arranged to overlap with each other.

Figure 6B:
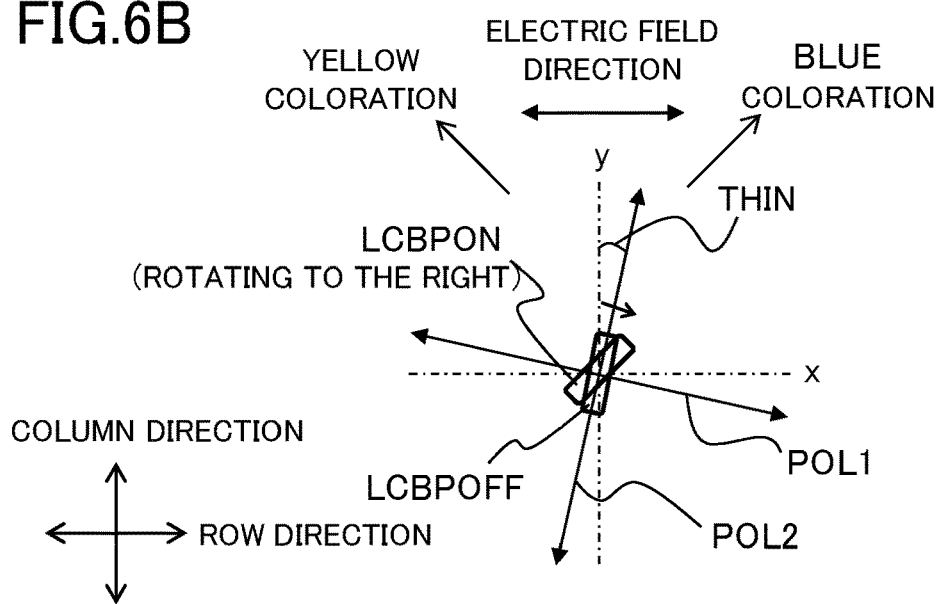

FIG. 6B illustrates operation of liquid crystal molecule LCB in an opening 6b of pixel PIX illustrated in FIG. 6A. Liquid crystal molecule LCB contained in liquid crystal layer LC of display panel LCP is a positive type liquid crystal molecule LCBP. POL1 represents a polarization axis of polarizing plate POL1, POL2 represents a polarization axis of polarizing plate POL2, and polarization axis POL1 and polarization axis POL2 are orthogonal to each other. Polarization axis POL2 has a predetermined angle THIN relative to the column direction (Y direction). An initial alignment direction (alignment axis) of liquid crystal molecule LCBP is set in the same direction as polarization axis POL2. In the above-described configuration, when an electric field (an electric field in a direction indicated by an arrow in FIG. 6A) is applied to liquid crystal layer LC, liquid crystal molecule LCBP rotates in an electric field direction (clockwise here).

Figure 8:
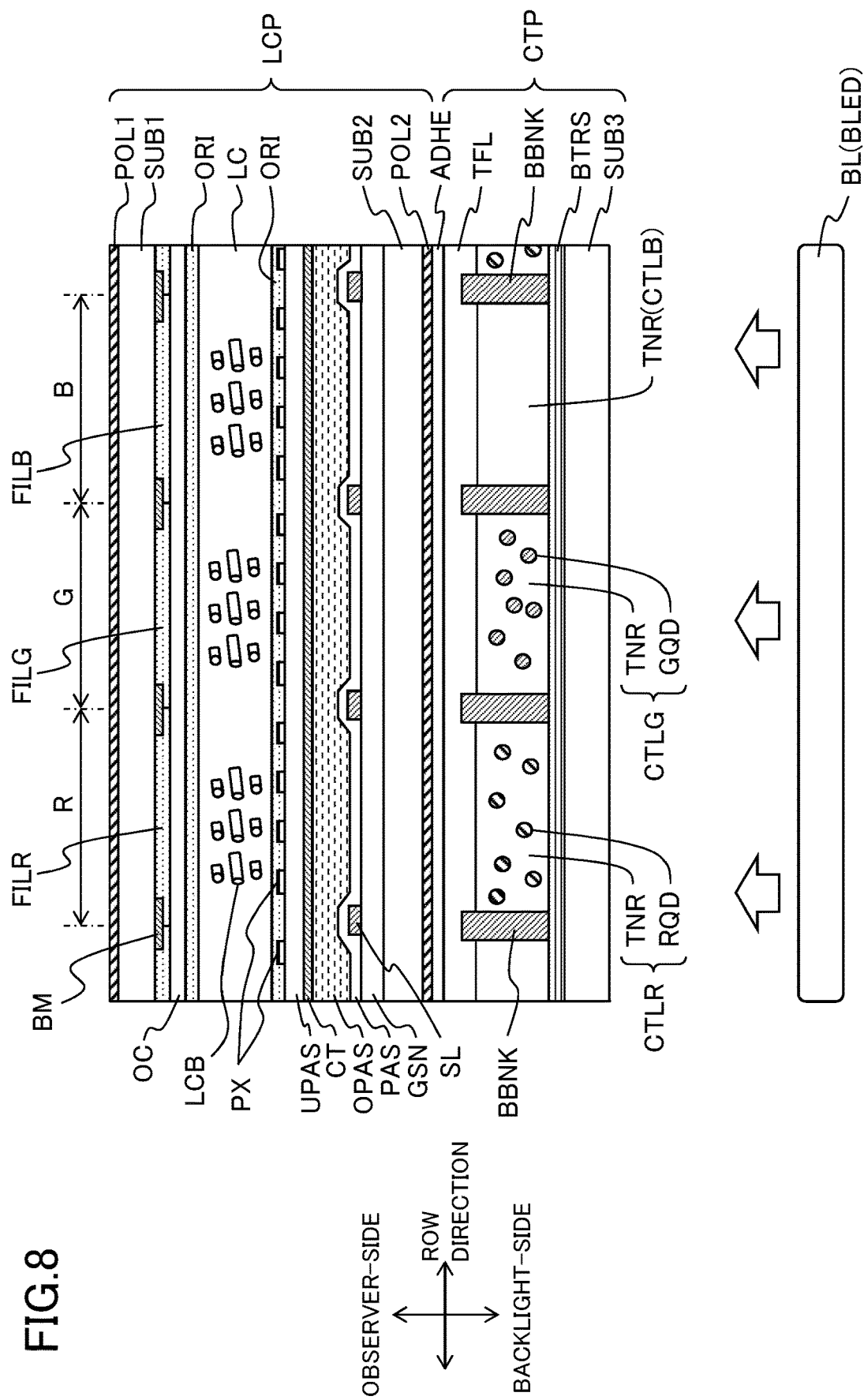
FIG. 8 is a sectional view taken along line 8-8' in FIGS. 6A and 7.
Figure 9:
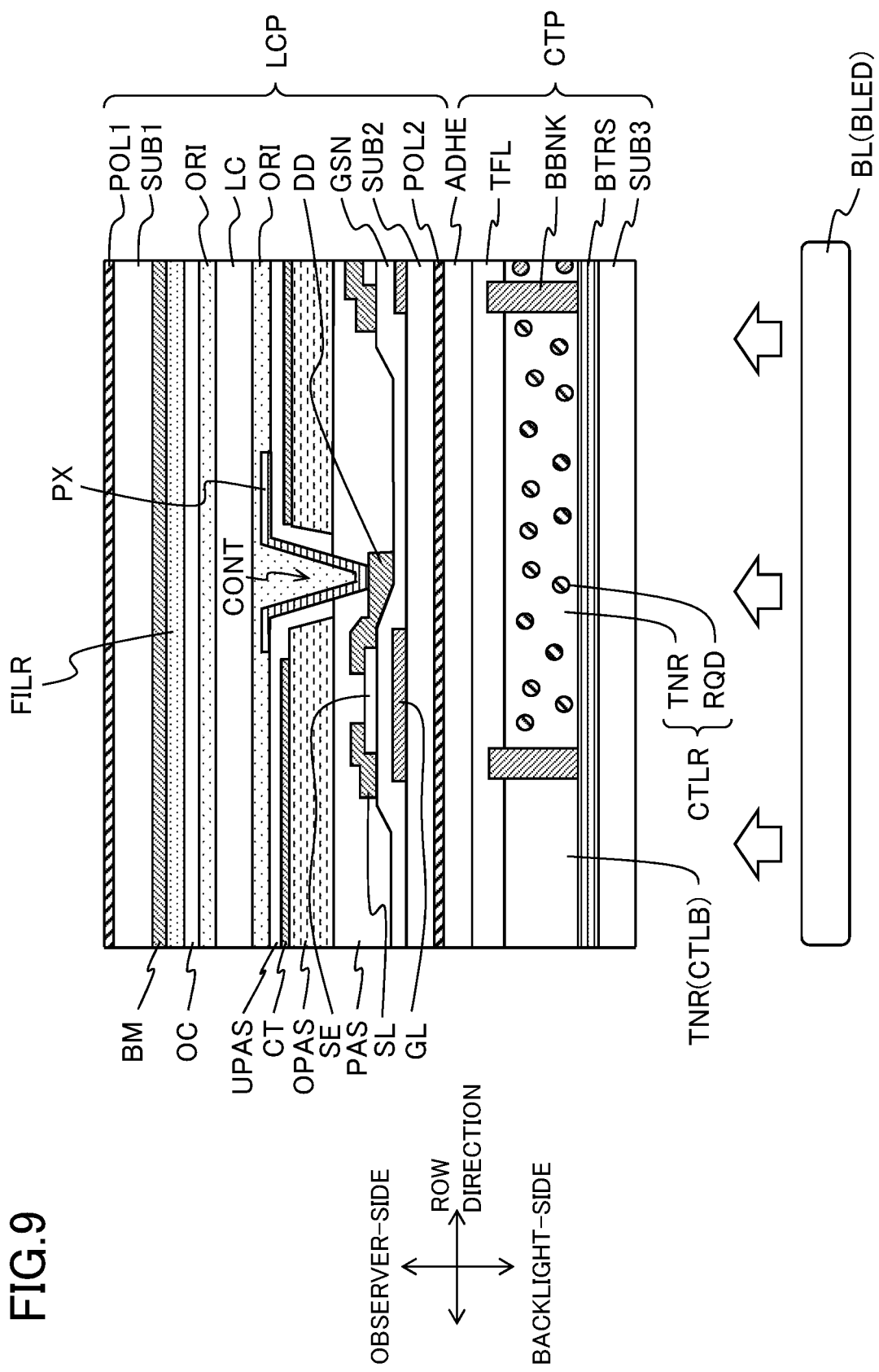
FIG. 9 is a sectional view taken along line 9-9' in FIGS. 6A and 7.

FIG. 8 is a sectional view taken along line 8-8' in FIGS. 6A and 7, and FIG. 9 is a sectional view taken along line 9-9' in FIGS. 6A and 7. The sectional structures of display dots DOT1 and DOT2 will be described with reference to FIGS. 8 and 9.

In thin film transistor substrate TFTB of display panel LCP (see FIG. 5), gate line GL is formed on transparent substrate SUB2 (glass substrate) (first substrate), and a gate insulating film GSN is formed to cover gate line GL. On gate insulating film GSN, semiconductor layer SE made of amorphous silicon (a-Si), source line SL (source electrode), and drain electrode DD are formed, and a protective film PAS and an organic insulating film OPAS are formed to cover semiconductor layer SE, source line SL, and drain electrode DD. Common electrode CT is formed on organic insulating film OPAS, and a protective film UPAS is formed to cover common electrode CT. Pixel electrode PX is formed on protective film UPAS, and an alignment film ORI is formed to cover pixel electrode PX. Contact hole CONT is formed in protective film PAS, organic insulating film OPAS, and protective film UPAS, and a part of pixel electrode PX is electrically connected to drain electrode DD via contact hole CONT.

In a counter substrate CF1 (see FIG. 5), black matrix BM and color filters FIL (red color filter FILR, green color filter FILG, and blue color filter FILB) are formed on a transparent substrate SUB1 (glass substrate) (second substrate). The surfaces of color filters FIL are coated with an overcoat film OC, and alignment film ORI is formed on overcoat film OC.

Liquid crystal layer LC is provided between thin film transistor substrate TFTB and counter substrate CF. Liquid crystal layer LC includes liquid crystal molecules LCB which are nematic liquid crystal.

In color conversion panel CTP, band-pass filter BTRS is formed on transparent substrate SUB3 (glass substrate), and light blocking part BBNK is formed on band-pass filter BTRS. In a region surrounded with light blocking part BBNK, color conversion layer CTL containing quantum dots QD (wavelength converting particles) and transparent resin TNR is formed, and transparent protective film TFL is formed on color conversion layer CTL. Color conversion layer CTL includes red color conversion layer CTLR containing quantum dots for red color conversion (hereinafter, referred to as red quantum dots RQD) and transparent resin TNR, green color conversion layer CTLG containing quantum dots for green color conversion (hereinafter, referred to as green quantum dots GQD) and transparent resin TNR, and blue color conversion layer CTLB composed of transparent resin TNR without containing quantum dots. Quantum dot QD is a fine particle of a semiconductor and changes the wavelength of incident light, depending on its particle size. For example, the particle size of red quantum dot RQD is set at 6 μm, and the particle size of green quantum dot GQD is set at 2.5 μm. That is, color conversion panel CTP converts light emitted from backlight BL into light of another color by changing the particle size of quantum dot QD and the ratio of quantum dots QD for each color conversion layer CTL. Band-pass filter BTRS has a property of allowing transmission of light (e.g., blue light) emitted from backlight BL and reflecting light (e.g., green light and red light) incident from the display panel LCP side and subjected to wavelength conversion. Band-pass filter BTRS is constituted of, for example, a dielectric multilayer film made of $TiO_2$, $SiO_2$ or the like.

Figure 10:
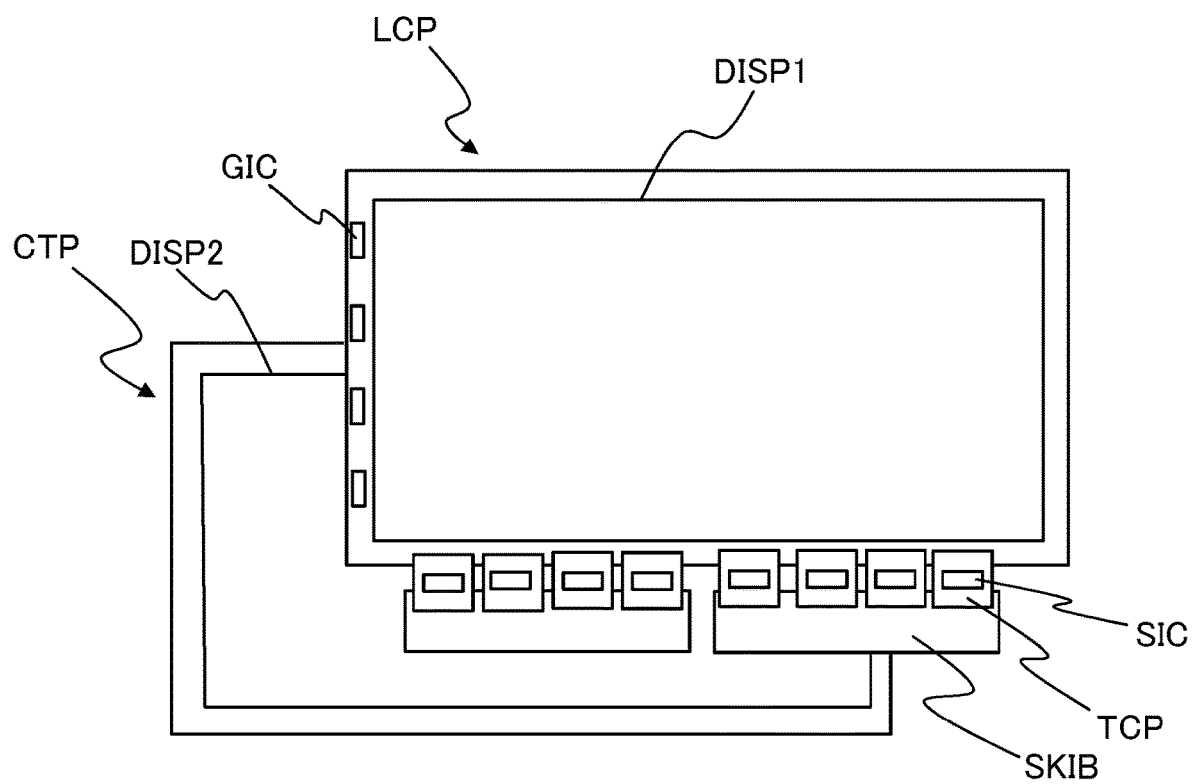
FIG. 10 is a diagram illustrating a configuration of a driver of liquid crystal display device.

FIG. 10 is a diagram illustrating a configuration of a driver of liquid crystal display device LCD. On display panel LCP, eight source driver ICs (SIC) and four gate driver ICs (GIC) are mounted.

Figure 11:
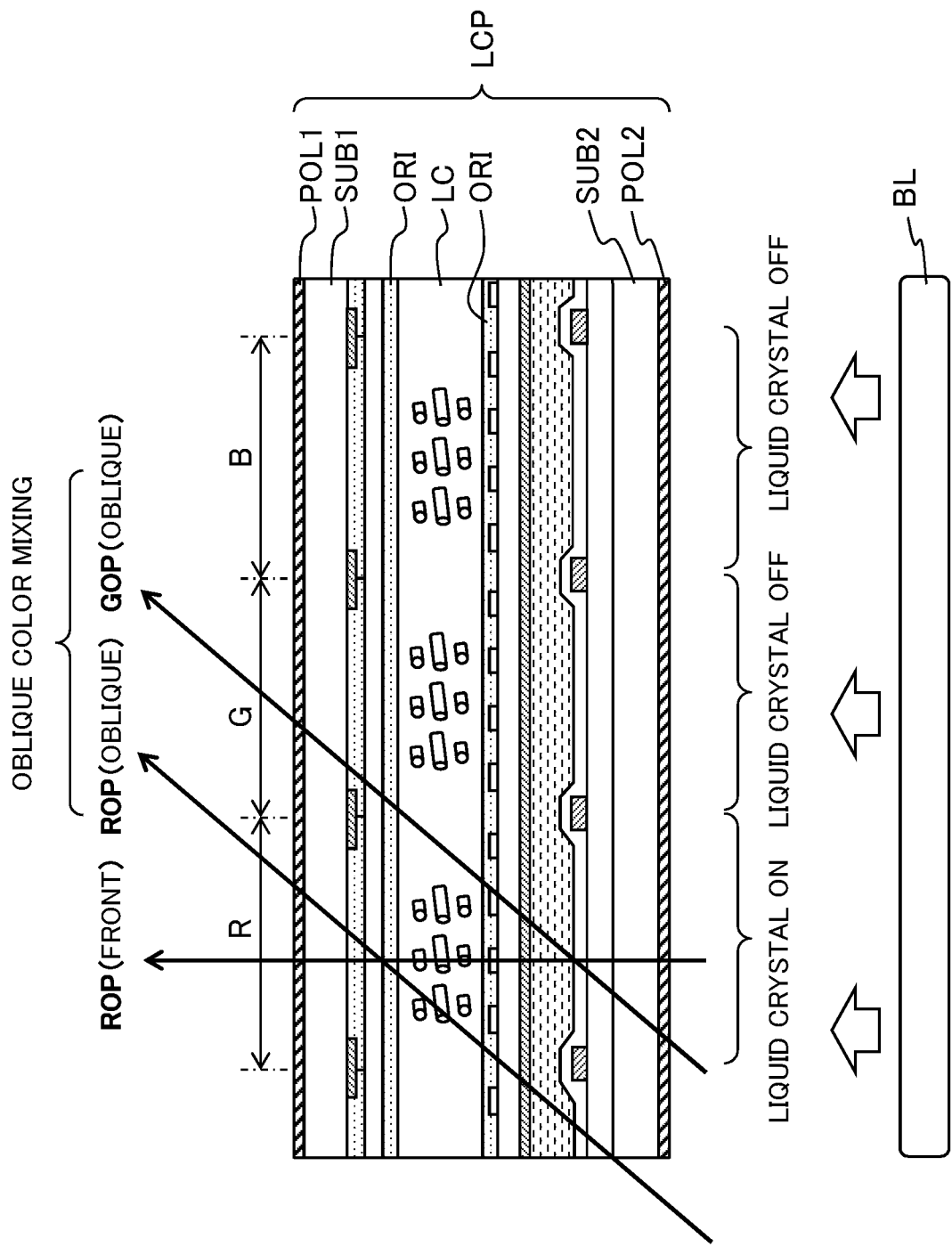
FIG. 11 is a sectional view illustrating a configuration of a conventional general liquid crystal display device.

FIG. 11 is a sectional view illustrating a configuration of a conventional general liquid crystal display device. FIG. 11 illustrates a state in which a liquid crystal is in an ON state in a red pixel, whereas liquid crystals are in an OFF state in a green pixel and a blue pixel, so that a red image is displayed as a whole. As illustrated in FIG. 11, when a display screen is seen obliquely, the conventional liquid crystal display device has a problem that, red light ROP passing through a red color filter layer from a liquid crystal layer in ON state and green light GOP passing through a green color filter from a liquid crystal layer in OFF state cause color mixing (oblique color mixing).

FIG. 12 illustrates a sectional view of liquid crystal display device LCD according to the first exemplary embodiment, and illustrates a state in which a red image is displayed as a whole. In liquid crystal display device LCD according to the first exemplary embodiment, color filter FIL and color conversion layer CTL are arranged with liquid crystal layer LC sandwiched therebetween from above and below. Therefore, as illustrated in FIG. 12, of red light emitted from red color conversion layer CTLR, light entering a green pixel region is absorbed by green color filter FILG. As described above, since the red light entering the green pixel region from the red pixel region can be blocked by green color filter FILG, oblique color mixing illustrated in FIG. 11 can be suppressed. According to the above-described configuration, since the width of black matrix BM does not need to be thickened in order to reduce oblique color mixing, the aperture ratio of pixel PIX can be improved. Note that black matrix BM may be omitted and, in this case, the aperture ratio can be further improved. Liquid crystal display device LCD according to the first exemplary embodiment is particularly suitable for a liquid crystal display device of an In-Plane Switching (IPS) method (also referred to as a lateral electric field method). That is, wide viewing angle display can be achieved by performing display by the IPS method. Conventionally, for realizing wide viewing angle display, it has been necessary to widen the width of black matrix BM since color mixing in an oblique view is likely to occur. For this reason, the aperture ratio is sacrificed, so that the viewing angle and the aperture ratio are in a trade-off relationship. According to the structure of the present exemplary embodiment, it is possible to realize liquid crystal display device LCD of the IPS method that causes no color mixing with the viewing angle and achieves bright and wide viewing angle without sacrificing the aperture ratio. Further, in liquid crystal display device LCD of the IPS method, liquid crystal layer LC is driven in an IPS mode.

Figure 13A:
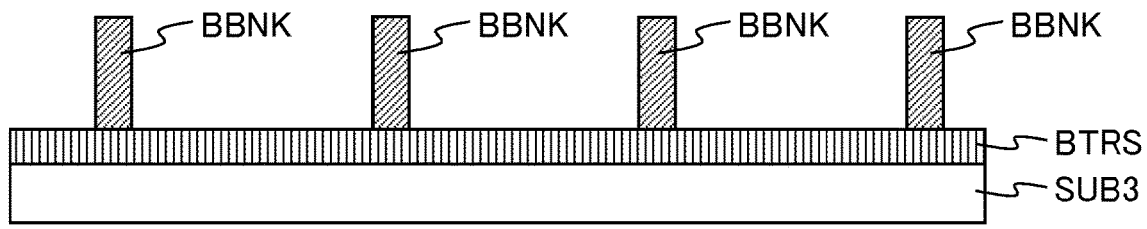
FIGS. 13A to 13D illustrate a method for manufacturing color conversion panel.

Now, a method for manufacturing color conversion panel CTP will be described with reference to FIGS. 13A to 13D. FIG. 13A illustrates a light blocking part (BBNK) forming step, FIGS. 13B and 13C each illustrate a color conversion layer (CTL) forming step, and FIG. 13D illustrates a transparent protective film (TFL) forming step.

First, as illustrated in FIG. 13A, light blocking part BBNK (black light blocking bank) is formed as follows. A carbon pigment for imparting a light blocking property is added to a photocurable resin based on monomers or oligomers having double bonds. A material curable by photo-radical polymerization is then applied to the resultant. Thereafter, the resultant is subjected to processes of exposure, development, and drying using a photomask. Regions partitioned by light blocking parts BBNK respectively constitute color dots (red dot DOTR, green dot DOTG, and blue dot DOTB). In a case of performing ink jet coating in the subsequent step, a water repellent material (for increasing a contact angle) is previously added to the uppermost surface such that the ink material can be easily separated by light blocking part BBNK. This additive material enhances the water repellency of the uppermost layer. It is preferable to select a material having an effect of increasing hydrophilicity of a bottom surface between the banks from which a bank resist is removed (an effect of decreasing the contact angle).

Figure 13B:
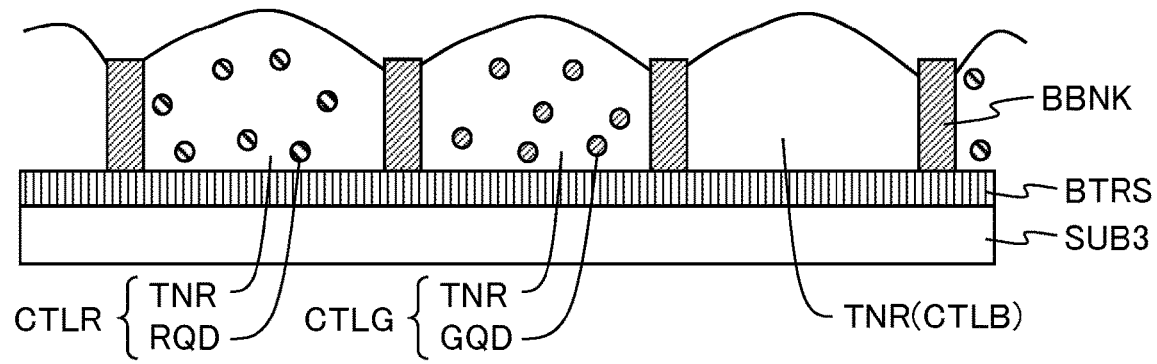

Next, as illustrated in FIG. 13B, an ink material containing quantum dots QD is applied by means of an inkjet apparatus. The ink material used herein is an ink material in which quantum dots QD are dispersed in a thermosetting resin composed of, for example, an epoxy compound and, for example, an aromatic ester solvent. The solvent is prepared using, for example, a mixture material having different two boiling points, such as dodecane and xylene, so that the dispersion accuracy can be enhanced. The ink material applied by the inkjet apparatus is contained in light blocking part BBNK with good efficiency since it is repelled at the upper surface, whose water repellency is higher, of light blocking part BBNK. Note that blue color conversion layer CTLB is prepared using an ink material which does not contain quantum dots, but mainly contains a transparent thermosetting resin and a solvent.

Figure 13C:
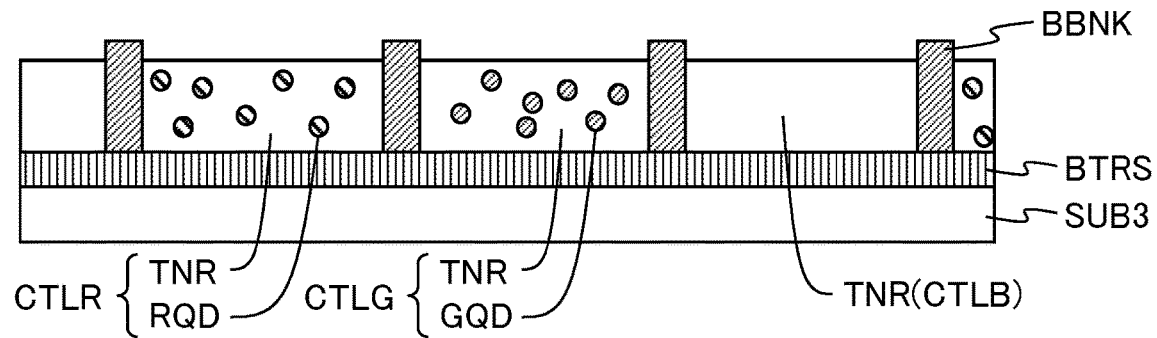
Figure 13D:
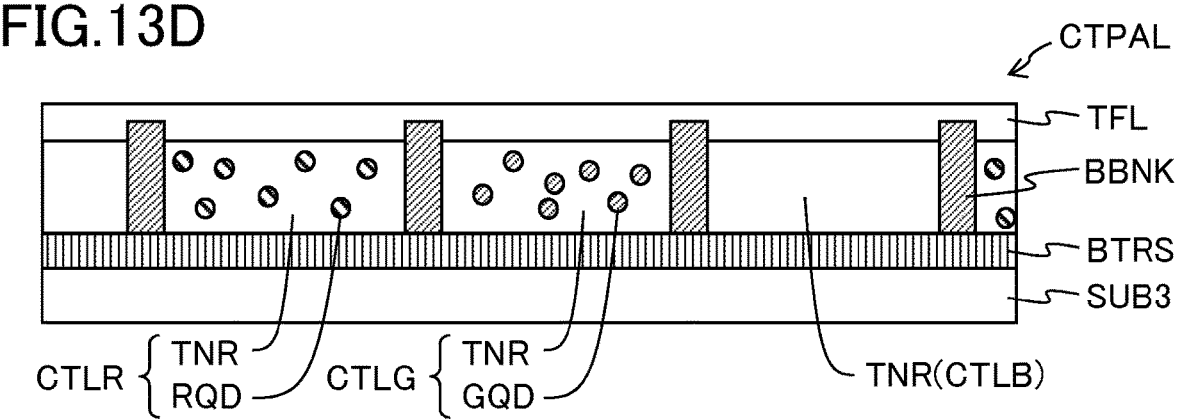

Next, as illustrated in FIG. 13C, baking and drying are performed. This processing evaporates the solvent, reduces the volume of the ink material, and cures the ink material. At this time, using at least two kinds of solvents which are different in boiling point from each other, red quantum dots RQD or green quantum dots GQD are dispersed in transparent resin TNR with good accuracy. Red quantum dots RQD and green quantum dots GQD dispersed in transparent resin TNR respectively convert blue light from backlight BL into red light and green light. In addition, red color conversion layer CTLR, green color conversion layer CTLG, and blue color conversion layer CTLB become lower in height than light blocking part BBNK. As a result, it is possible to prevent color mixing which may occur since emitted light spreads to the left and right pixels. Moreover, since blue color conversion layer CTLB does not contain quantum dots, the layer of transparent resin TNR thermally cured is formed to allow transmission of blue light emitted from the blue LED of backlight BL.

Next, as illustrated in FIG. 13D, transparent protective film TFL is formed on upper portions of red color conversion layer CTLR, green color conversion layer CTLG, and blue color conversion layer CTLB. Transparent protective film TFL is made of a thermosetting resin or ultraviolet curable resin and is cured by heating or ultraviolet radiation. Transparent protective film TFL may have a configuration in which a transparent oxide such as ITO and a transparent resin are laminated, in order to prevent adsorption of moisture into red color conversion layer CTLR and green color conversion layer CTLG. Red color conversion layer CTLR and green color conversion layer CTLG formed through the above-described steps each have a half-value breadth of a light emission wavelength spectrum in which light converted from blue light is not less than about 45 nm and is not more than 30 nm at minimum, and are capable of improving color purity or color reproducibility in this range.

In the above-described manufacturing method, an example using the wet inkjet (a printing method as its classification) has been described as the method for manufacturing red color conversion layer CTLR, green color conversion layer CTLG, and blue color conversion layer CTLB. The above-described manufacturing method is capable of efficiently using quantum dots which is relatively high price at the moment. Also In the above-described manufacturing method, it is needless to say that red color conversion layer CTLR and green color conversion layer CTLG can be formed in such a manner that a resist material obtained by dispersing quantum dots RQD or GQD in a negative photosensitive resist is subjected to photo processing involving application, exposure, development, and drying three times.

Note that examples of the materials constituting quantum dots QD may include: an element selected from Group 14 elements in the Periodic Table, such as carbon, silicon, germanium, and tin; an element selected from Group 15 elements in the Periodic Table, such as phosphorus (black phosphorus); an element selected from Group 16 elements in the Periodic Table, such as selenium and tellurium; a compound of Group 14 elements in the Periodic Table, such as silicon carbide (SiC); a compound of Group 14 elements in the Periodic Table and Group 16 elements in the Periodic Table, such as tin (IV) oxide ($SnO_2$), tin (II, IV) sulfide (Sn(II), $SN(IV)S_3$), tin (IV) sulfide ($SnS_2$), tin (II) sulfide (SnS), tin (II) selenide (SnSe), tin (II) telluride (SnTe), lead (II) sulfide (PbS), lead (II) selenide (PbSe), and lead (II) telluride (PbTe); a compound (or a III-V group compound semiconductor) of Group 13 elements in the Periodic Table and Group 15 elements in the Periodic Table, such as boron nitride (BN), boron phosphide (BP), boron arsenide (BAs), aluminum nitride (AlN), aluminum phosphide (AlP), aluminum arsenide (AlAs), aluminum antimonide (AlSb), gallium nitride (GaN), gallium phosphide (GaP), gallium arsenide (GaAs), gallium antimonide (GaSb), indium nitride (InN), indium phosphide (InP), indium arsenide (InAs), and indium antimonide (InAs); a compound of Group 13 elements in the Periodic Table and Group 16 elements in the Periodic Table, such as aluminum sulfide ($Al_3S_2$), aluminum selenide ($Al_2Se_3$), gallium sulfide ($Ga_2S_3$), gallium selenide ($Ga_2Se_3$), gallium telluride ($Ga_2Te_3$), indium oxide ($In_2O_3$), indium sulfide ($In_2S_3$), indium selenide ($In_2Se_3$), and indium telluride ($In_2Te_3$); a compound of Group 13 elements in the Periodic Table and Group 17 elements in the Periodic Table, such as thallium (I) chloride (TlCl), thallium (I) bromide (TlBr), and thallium (I) iodide (TlI); a compound (or a II-VI group compound semiconductor) of Group 12 elements in the Periodic Table and Group 16 elements in the Periodic Table, such as zinc oxide (ZnO), zinc sulfide (ZnS), zinc selenide (ZnSe), zinc telluride (ZnTe), cadmium oxide (CdO), cadmium sulfide (CdS), cadmium selenide (CdSe), cadmium telluride (CdTe), mercuric sulfide (HgS), mercuric selenide (HgSe), and mercuric telluride (HgTe); a compound of Group 15 elements in the Periodic Table and Group 16 elements in the Periodic Table, such as arsenic (III) sulfide ($As_2S_3$), arsenic (III) selenide ($As_2Se_3$), arsenic (III) telluride ($As_2Te_3$), antimony (III) sulfide ($Sb_2S_3$), antimony (III) selenide ($Sb_2Se_3$), antimony (III) telluride ($Sb_2Te_3$), bismuth (III) sulfide ($Bi_2S_3$), bismuth (III) selenide ($Bi_2Se_3$), and bismuth (III) telluride ($Bi_2Te_3$); a compound of Group 11 elements in the Periodic Table and Group 16 elements in the Periodic Table, such as copper (I) oxide ($Cu_2O$) and copper (I) selenide ($Cu_2Se$); a compound of Group 11 elements in the Periodic Table and Group 17 elements in the Periodic Table, such as copper (I) chloride (CuCl), copper (I) bromide (CuBr), copper (I) iodide (CuI), silver chloride (AgCl), and silver bromide (AgBr); a compound of Group 10 elements in the Periodic Table and Group 16 elements in the Periodic Table, such as nickel (II) oxide (NiO); a compound of Group 9 elements in the Periodic Table and Group 16 elements in the Periodic Table, such as cobalt (II) oxide (CoO) and cobalt (II) sulfide (CoS); a compound of Group 8 elements in the Periodic Table and Group 16 elements in the Periodic Table, such as triiron tetraoxide and iron (II) sulfide ($Fe_3O_2$); a compound of Group 7 elements in the Periodic Table and Group 16 elements in the Periodic Table, such as manganese (II) oxide (MnO); a compound of Group 6 elements in the Periodic Table and Group 16 elements in the Periodic Table, such as molybdenum (IV) sulfide ($MoS_2$) and tungstic (IV) oxide ($WO_2$); a compound of Group 5 elements in the Periodic Table and Group 16 elements in the Periodic Table, such as vanadium (II) oxide, vanadium (IV) oxide, and tantalic (V) oxide ($Ta_2O_5$); a compound of Group 4 elements in the Periodic Table and Group 16 elements in the Periodic Table, such as titanium oxide ($TiO_2$, $Ti_2O_5$, $Ti_2O_3$, $Ti_5O_9$, etc.); a compound of Group 2 elements in the Periodic Table and Group 16 elements in the Periodic Table, such as magnesium sulfide (MgS) and magnesium selenide (MgSe); chalcogen spinels such as cadmium (II) chromium (III) oxide ($CdCr_2O_4$), cadmium (II) chromium (III) selenide ($CdCr_2Se_4$), copper (II) chromium (III) sulfide ($CuCr_2S_4$) and mercuric (II) chromium (III) selenide ($HgCr_2Se_4$); and barium titanate ($BaTiO_4$). A compound of Group 14 elements in the Periodic Table such as $SnS_2$, SnS, SnSe, SnTe, PbS, PbSe, PbTe and so on and Group 16 elements in the Periodic Table, a III-V group compound semiconductor such as GaN, GaP, GaAs, GaSb, InN, InP, InAs, InSb and so on, a compound of Group 13 elements in the Periodic Table and Group 16 elements in the Periodic Table such as $Ga_2O_3$, $Ga_2S_3$, $Ga_2S_3$, $Ga_2Te_3$, $In_2O_3$, $In_2S_3$, $In_2S_3$, $In_2Te_3$ and so on, a II-VI group compound semiconductor such as ZnO, ZnS, ZnSe, ZnTe, CdO, CdS, CdSe, CdTe, HgO, HgS, HgSe, HgTe and so on, a compound of Group 15 elements in the Periodic Table and Group 16 elements in the Periodic Table such as $As_2O_3$, $As_2S_3$, $As_2S_3$, $As_2Te_3$, $Sb_2O_3$, $Sb_2S_3$, $Sb_2S_3$, $Sb_2Te_3$, $Bi_2O_3$, $Bi_2S_3$, $Bi_2S_3$, $Bi_2Te_3$ and so on, and a compound of Group 2 elements in the Periodic Table and Group 16 elements in the Periodic Table such as MgS and MgSe are preferable. In particular, Si, Ge, GaN, GaP, InN, InP, $Ga_2O_3$, $Ga_2S_3$, $In_2O_3$, $In_2S_3$, ZnO, ZnS, CdO, CdS are more preferable. These substances contain no electronegative element having high toxicity and, therefore, are excellent in resistance to environmental pollution and safety of organism. In addition, these substances can stably obtain a pure spectrum in a visible light region and, therefore, are advantageous in forming a light emitting device. Of these materials, CdSe, ZnSe, CdS are preferable in terms of the stability of light emission. From the standpoint of light emission efficiency, high refractive index, safety, and economy, quantum dots of ZnO and ZnS are preferable. The above-described materials may be used singly or may be used in combination.

Second Exemplary Embodiment

A second exemplary embodiment of the present disclosure will be described below with reference to the drawings. For convenience, the same component as that of the first exemplary embodiment is designated by the same numeral, and the description will be omitted. In the second exemplary embodiment, the term defined in the first exemplary embodiment is used according to the definition of the first exemplary embodiment unless otherwise noted.

Figure 14:
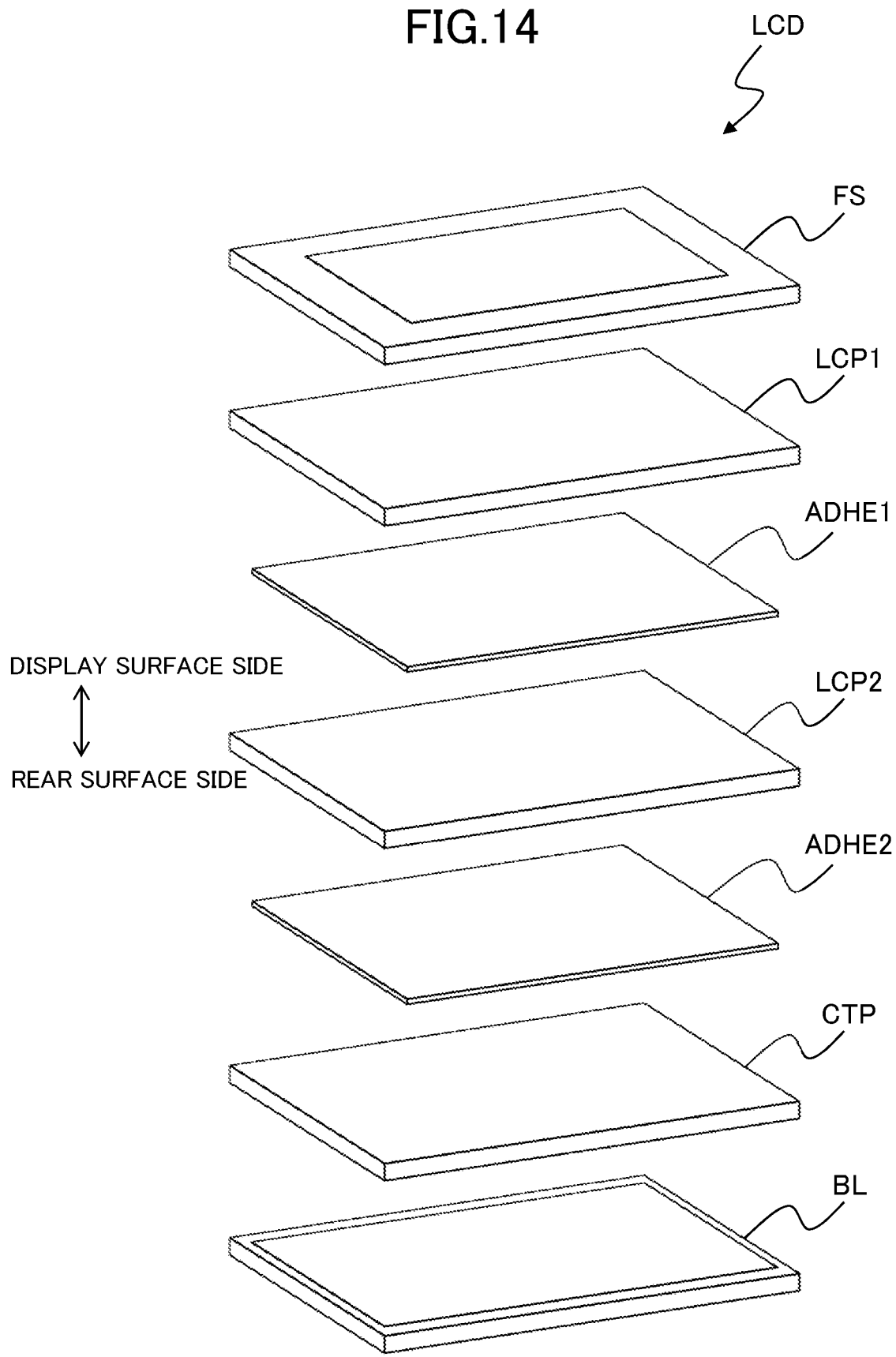
FIG. 14 is an exploded perspective view illustrating a schematic configuration of a liquid crystal display device according to a second exemplary embodiment.

FIG. 14 is an exploded perspective view illustrating a schematic configuration of a liquid crystal display device LCD according to a second exemplary embodiment. As illustrated in FIG. 14, liquid crystal display device LCD includes a display panel LCP1 disposed at a position (display surface side: first direction) closer to an observer, a display panel LCP2 disposed at a position (back surface side: second direction) farther from the observer than display panel LCP1 is, a color conversion panel CTP disposed on the back surface side of display panel LCP2, a backlight BL disposed on the back surface side of color conversion panel CTP, a front chassis FS covering display panels LCP1 and LCP2 and color conversion panel CTP from the display surface side, an adhesive ADHE1 (adhesive layer) for bonding display panel LCP1 and display panel LCP2 together, and an adhesive ADHE2 (adhesive layer) for bonding display panel LCP2 and color conversion panel CTP together.

Figure 15:
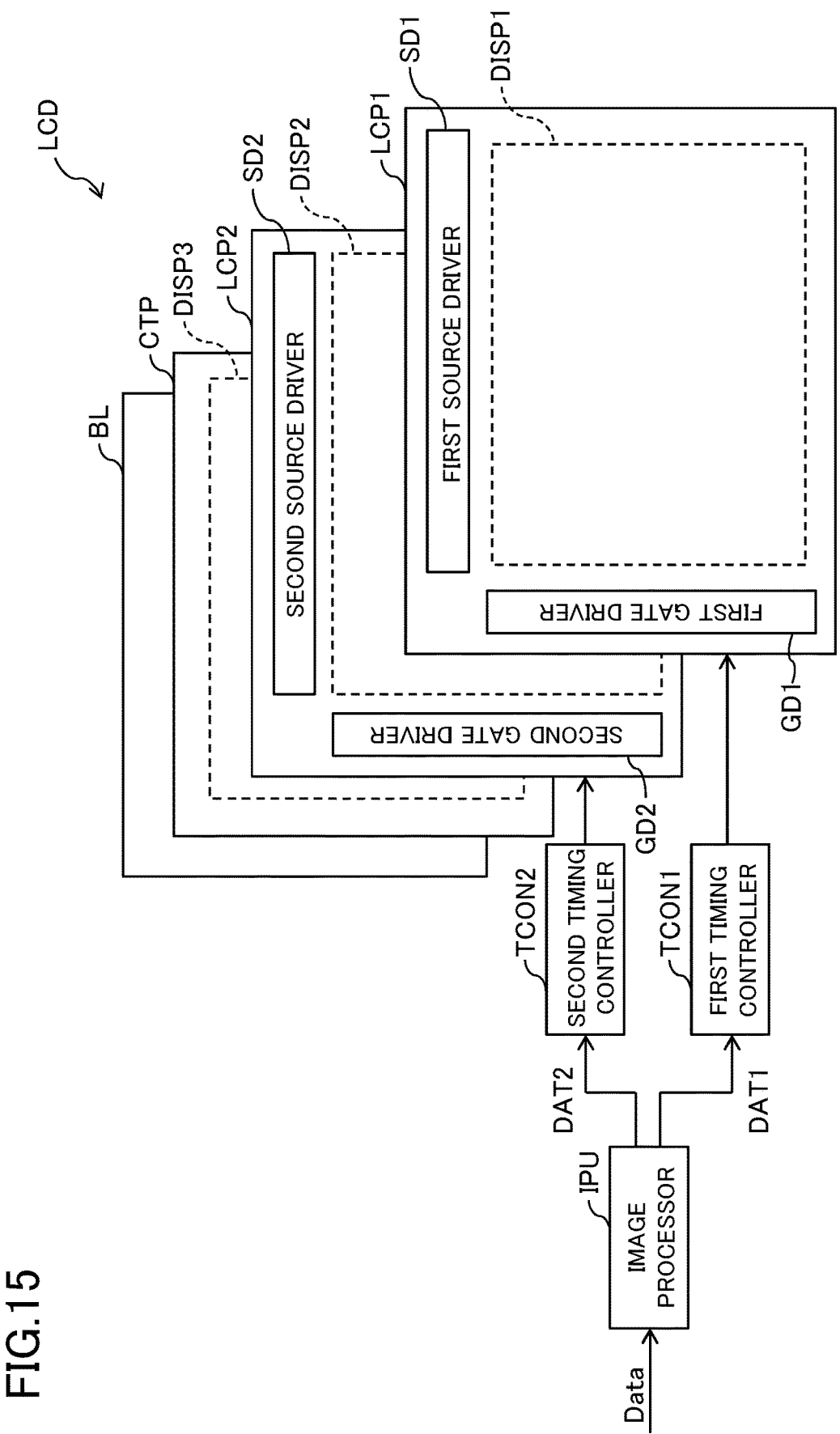
FIG. 15 is a block diagram schematically illustrating a schematic configuration of liquid crystal display device according to the second exemplary embodiment.

FIG. 15 is a block diagram schematically illustrating a schematic configuration of liquid crystal display device LCD according to the second exemplary embodiment. As illustrated in FIG. 15, display panel LCP1 includes a first source driver SD1 and a first gate driver GD1, and display panel LCP2 includes a second source driver SD2 and a second gate driver GD2. Liquid crystal display device LCD also includes a first timing controller TCON1 for controlling first source driver SD1 and first gate driver GD1, a second timing controller TCON2 for controlling second source driver SD2 and second gate driver GD2, and an image processor IPU for outputting image data to each of first timing controller TCON1 and second timing controller TCON2. For example, display panel LCP1 displays a color image responsive to an input video signal on a first display region DISP1, and display panel LCP2 displays a monochrome image responsive to an input video signal on a second display region DISP2. Image processor IPU receives input video signal Data transmitted from an external system (not illustrated) and, after performing known image processing, outputs first image data DAT1 to first timing controller TCON1 and outputs second image data DAT2 to second timing controller TCON2. Image processor IPU also outputs a control signal such as a synchronizing signal (not illustrated in FIG. 2) to first timing controller TCON1 and second timing controller TCON2. For example, first image data DAT1 is image data for color image display, and second image data DAT2 is image data for monochrome image display. Note that display panel LCP1 may be configured to display a monochrome image, and display panel LCP2 may be configured to display a color image.

Figure 16:
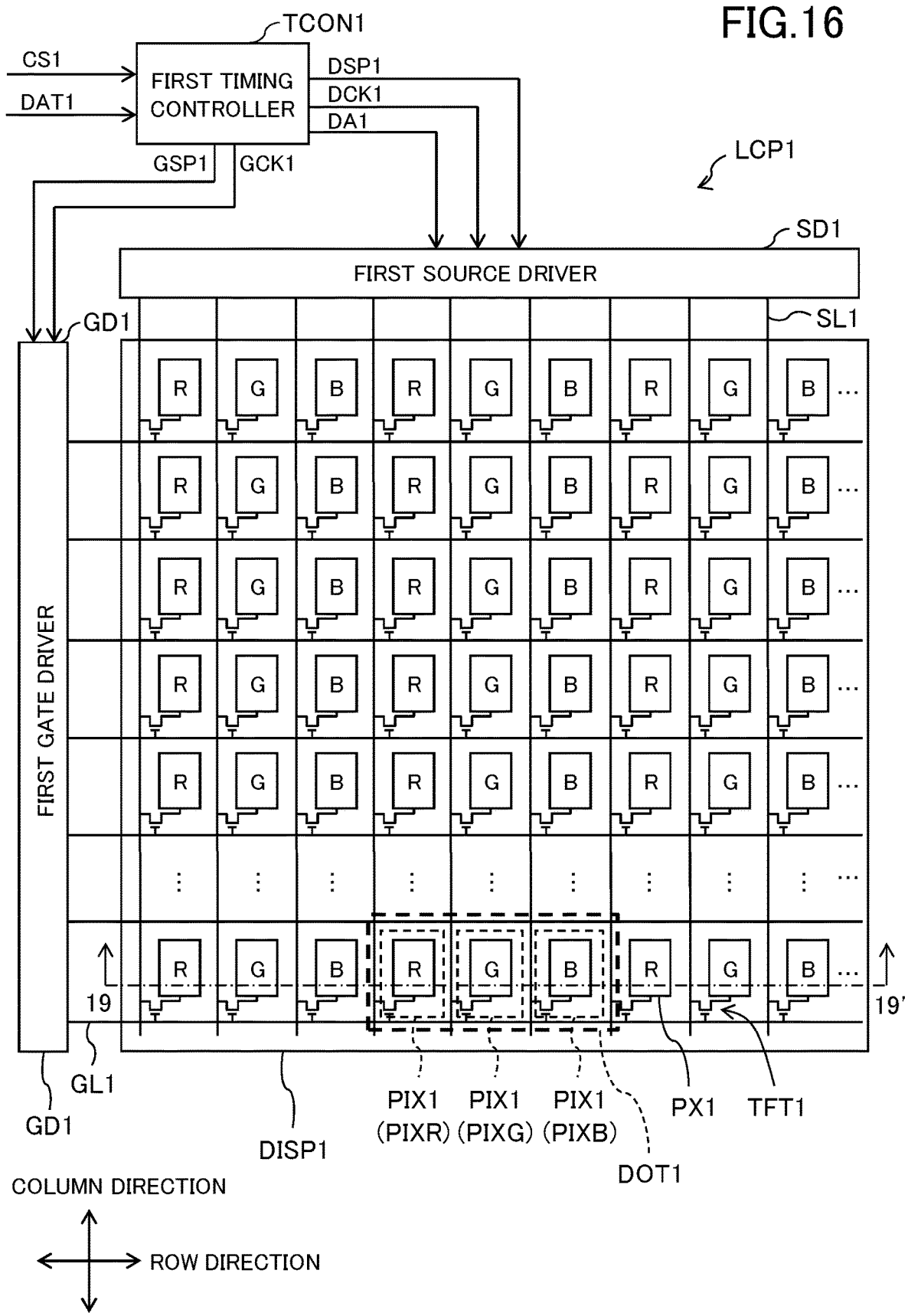
FIG. 16 is a plan view illustrating a configuration of display panel LCP2 according to the second exemplary embodiment.
Figure 17:
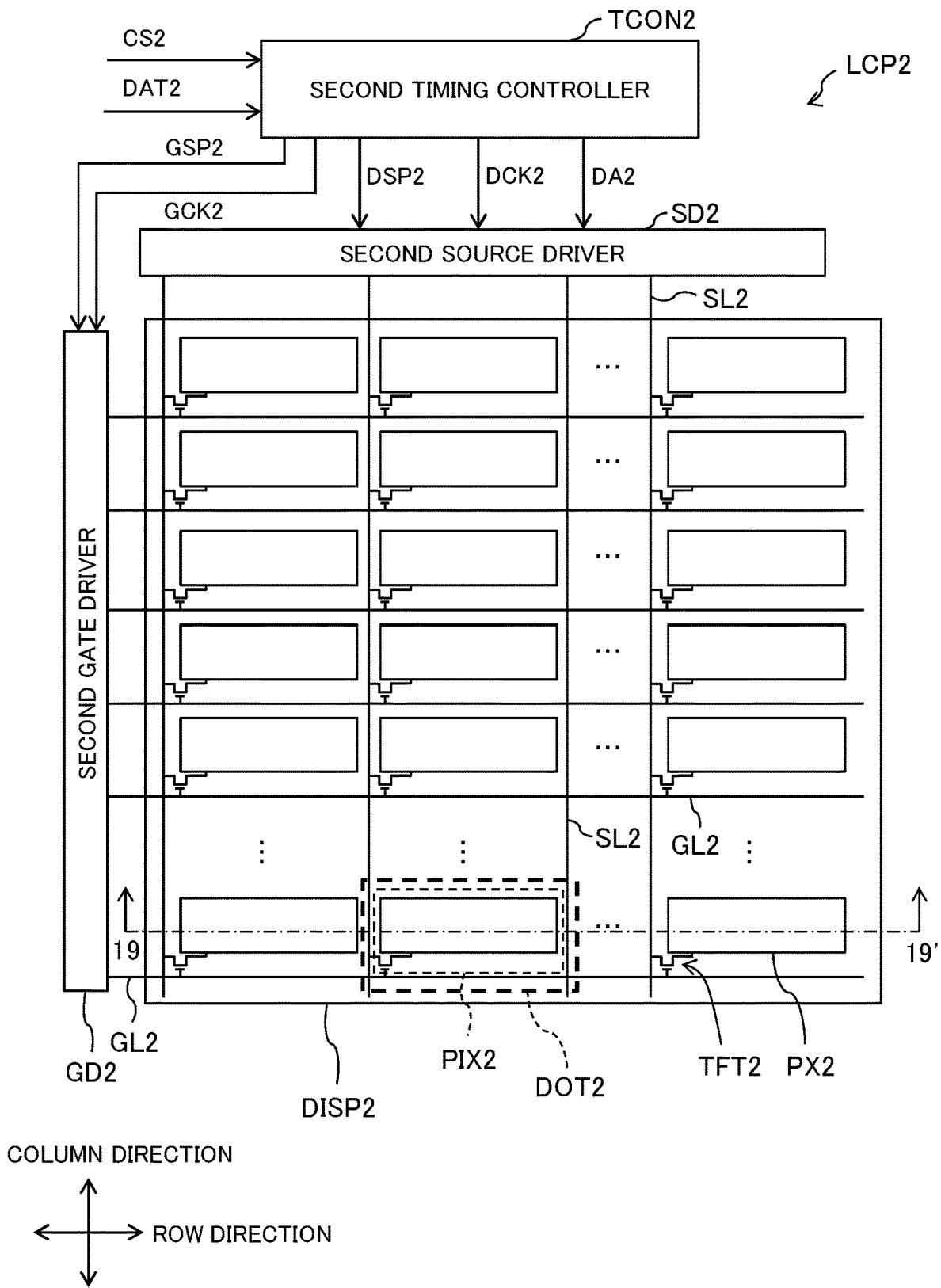
FIG. 17 is a plan view illustrating a configuration of display panel LCP2 according to the second exemplary embodiment.
Figure 18:
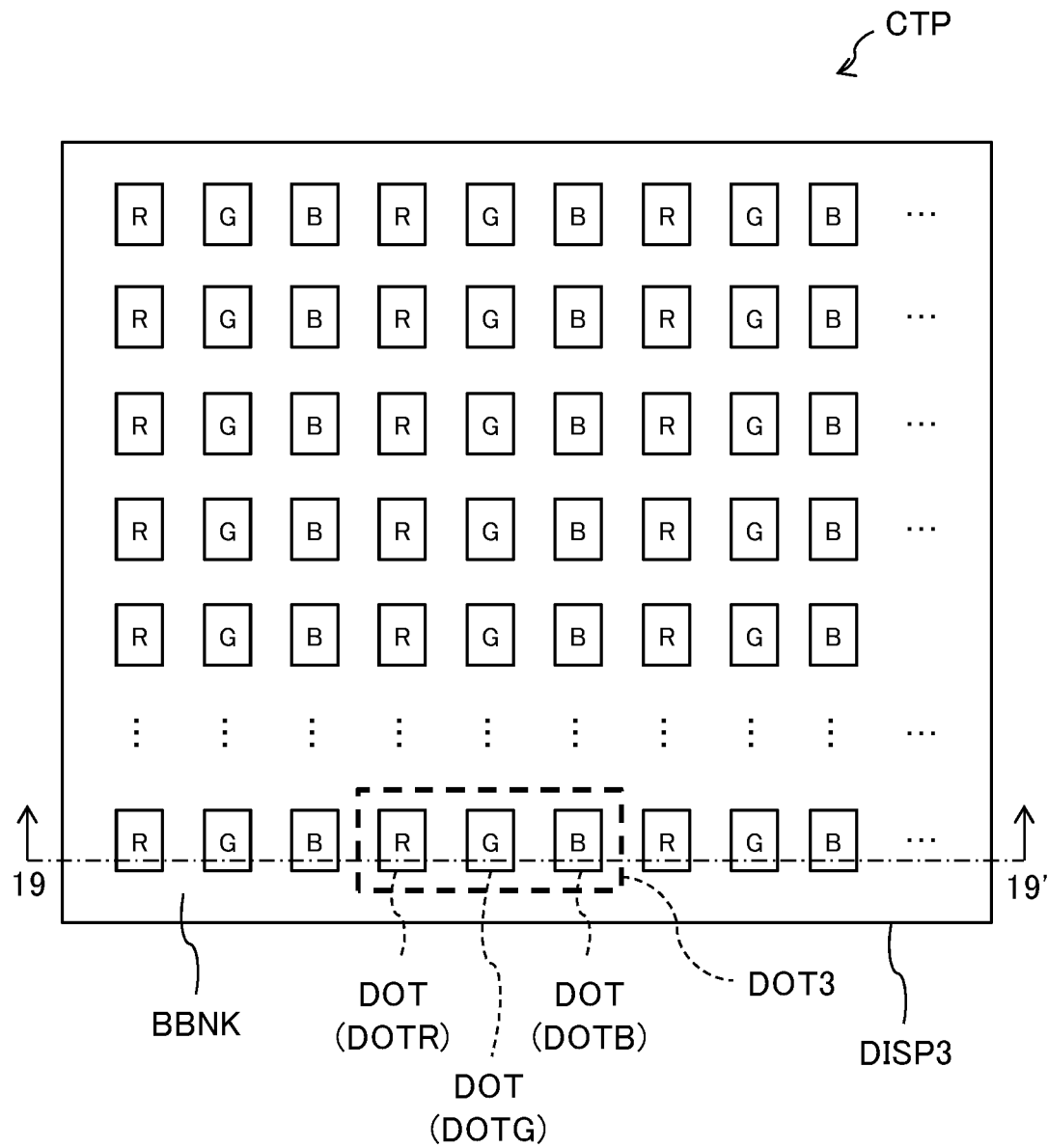
FIG. 18 is a plan view illustrating a configuration of color conversion panel CTP according to the second exemplary embodiment.
Figure 19:
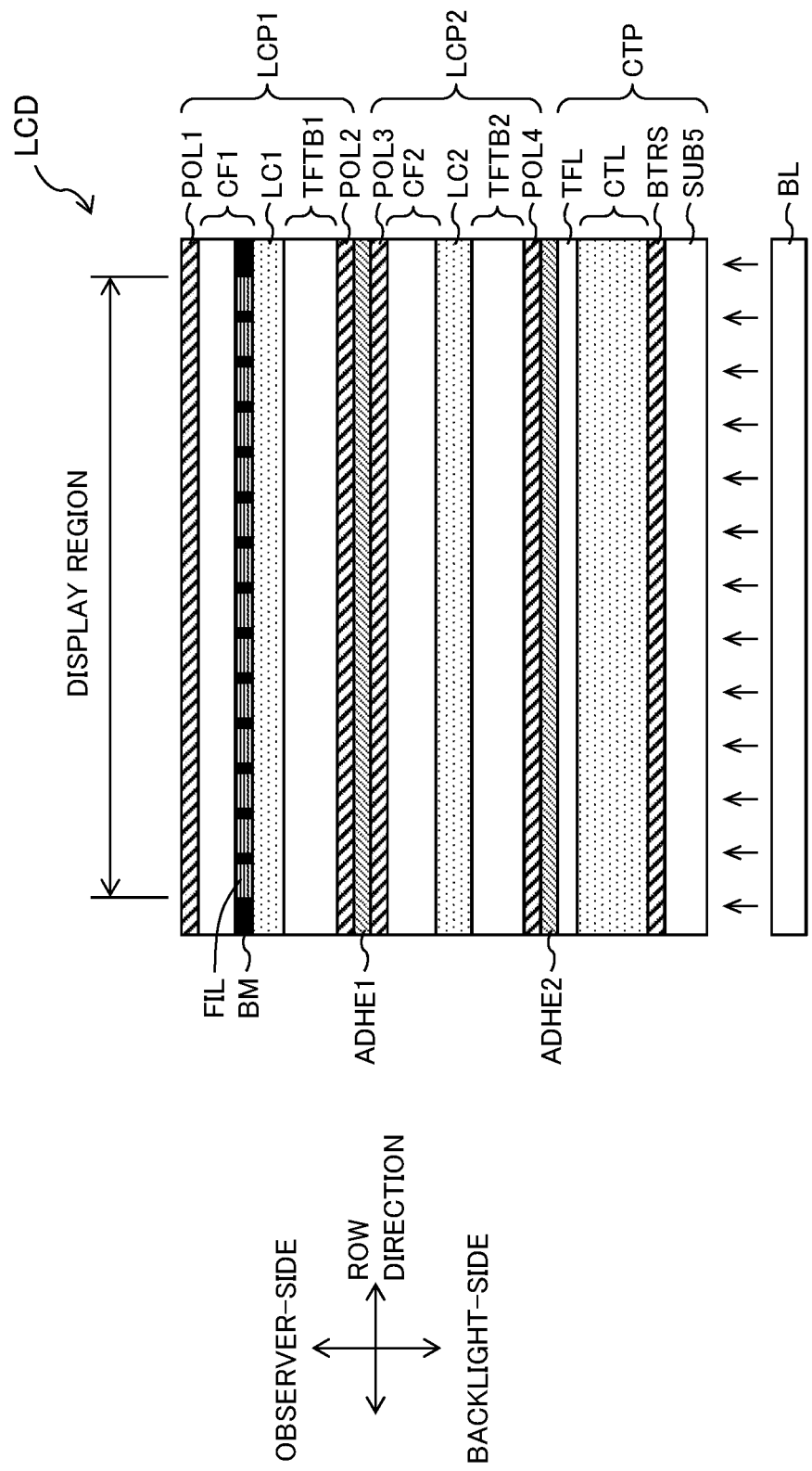
FIG. 19 is a sectional view taken along line 19-19' in FIGS. 16 to 18.

FIG. 16 is a plan view illustrating a configuration of display panel LCP1 according to the second exemplary embodiment. FIG. 17 is a plan view illustrating a configuration of display panel LCP2 according to the second exemplary embodiment. FIG. 18 is a plan view illustrating a configuration of color conversion panel CTP according to the second exemplary embodiment. FIG. 19 is a sectional view taken along line 19-19' in FIGS. 16 to 18. Note that display panel LCP1 according to the second exemplary embodiment has the same configuration as that of display panel LCP (see FIG. 3) according to the first exemplary embodiment, and color conversion panel CTP according to the second exemplary embodiment has the same configuration as that of color conversion panel CTP (see FIG. 4) according to the first exemplary embodiment. Therefore, the description thereof will be omitted. Hereinafter, a configuration of display panel LCP2 will be mainly described.

As illustrated in FIG. 19, display panel LCP2 includes a thin film transistor substrate TFTB2 disposed on the backlight BL side, a counter substrate CF2 disposed on the observer side so as to face thin film transistor substrate TFTB2, and a liquid crystal layer LC2 disposed between thin film transistor substrate TFTB2 and counter substrate CF2. A polarizing plate POL3 is disposed on the observer side of display panel LCP2, and a polarizing plate POL4 is disposed on the backlight BL side. Adhesive ADHE2 is disposed between polarizing plate POL2 of display panel LCP1 and polarizing plate POL3 of display panel LCP2.

As illustrated in FIG. 17, thin film transistor substrate TFTB2 has, formed thereon, source lines SL2 extending in the column direction, gate lines GL2 extending in the row direction, and thin film transistors TFT2 respectively formed in the vicinity of intersections between source lines SL2 and gate lines GL2. A pixel PIX2 is defined by adjoining two of source lines SL2 and adjoining two of gate lines GL2 when display panel LCP2 is seen in plan view, and pixels PIX2 are arranged in a matrix form (in the row direction and the column direction). Source lines SL2 are arranged at equal intervals in the row direction, and gate lines GL2 are arranged at equal intervals in the column direction. In thin film transistor substrate TFTB2, a pixel electrode PX2 is formed for each pixel PIX2, and one common electrode CT2 (see, for example, FIG. 22) common to pixels PIX2 is formed. A source electrode which constitutes thin film transistor TFT2 is electrically connected to source line SL2, a drain electrode DD2 (see FIG. 21) is electrically connected to pixel electrode PX2 via a contact hole CONT2 (see FIG. 21), and a gate electrode is electrically connected to gate line GL2.

Counter substrate CF2 has, formed thereon, a light transmission part allowing transmission of light, and black matrix BM2 (light blocking part). Black matrix BM2 is formed to extend in the row direction so as to overlap with a region where thin film transistor substrate TFTB2 and gate line GL2 are formed in plan view. A color filter (colored portion) is not formed, but an overcoat film OC is formed on the light transmission part.

Second timing controller TCON2 has a configuration known in the art. For example, second timing controller TCON2 generates second image data DA2 as well as various timing signals (data start pulse DSP2, data clock DCK2, gate start pulse GSP2, gate clock GCK2) for controlling the driving of second source driver SD2 and second gate driver GD2, based on second image data DAT2 and a second control signal CS2 (e.g., a clock signal, a vertical synchronizing signal, a horizontal synchronizing signal) output from image processor IPU (see FIG. 17). Second timing controller TCON2 outputs second image data DA2, data start pulse DSP2, and data clock DCK2 to second source driver SD2. Second timing controller TCON2 also outputs gate start pulse GSP2 and gate clock GCK2 to second gate driver GD2.

Second source driver SD2 outputs a data voltage responsive to second image data DA2 to source line SL2, based on data start pulse DSP2 and data clock DCK2. Second gate driver GD2 outputs a gate voltage to gate line GL2, based on gate start pulse GSP2 and gate clock GCK2.

To each source line SL2, a data voltage is supplied from second source driver SD2. To each gate line GL2, a gate voltage is supplied from second gate driver GD2. To common electrode CT2, a common voltage Vcom is supplied from a common driver. When the gate voltage (gate-on voltage) is supplied to gate lines GL2, thin film transistors TFT2 connected to gate lines GL2 are turned on, and the data voltage is supplied to pixel electrodes PX2 through source lines SL2 connected to thin film transistors TFT2. An electric field is generated by a difference between the data voltage supplied to pixel electrodes PX2 and common voltage Vcom supplied to common electrode CT2. An image is displayed by driving liquid crystal molecules LCBN (see FIG. 22) using this electric field, and controlling the transmittance of light emitted from backlight BL and color conversion panel CTP. On display panel LCP2, a monochrome image is displayed.

Liquid crystal display device LCD has a configuration that the number of pixels PIX 2 per unit area of display panel LCP2 is smaller than the number of pixels PIX1 per unit area of display panel LCP1. For example, liquid crystal display device LCD has a configuration that a ratio between the number of pixels PIX1 of display panel LCP1 and the number of pixels PIX2 of display panel LCP2 is 3:1. More specifically, liquid crystal display device LCD has a configuration that three pixels PIX1 (red pixel PIXR, green pixel PIXG, and blue pixel PIXB) of display panel LCP1 and one pixel PIX2 of display panel LCP2 are superimposed on each other in plan view. One pixel PIX2 of display panel LCP2 constitutes one display dot DOT2.

Figure 20A:
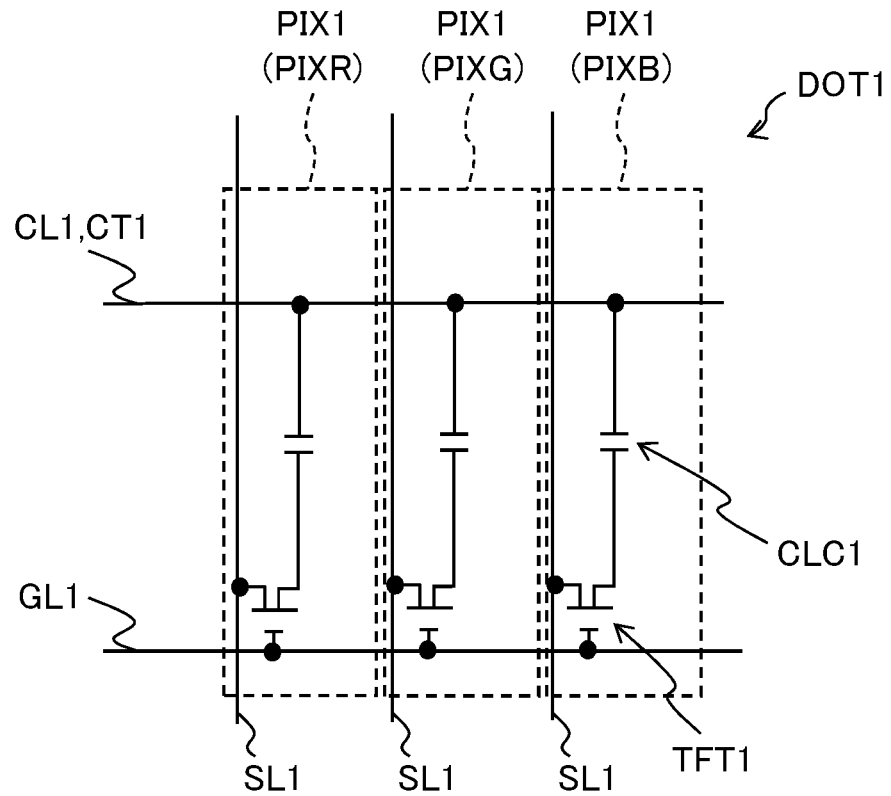
FIGS. 20A and 20B are plan views each illustrating a relationship between a pixel PIX1 of display panel LCP1 and a pixel PIX2 of display panel LCP2, the pixel PIX1 and the pixel PIX2 overlapping with each other.
Figure 20B:
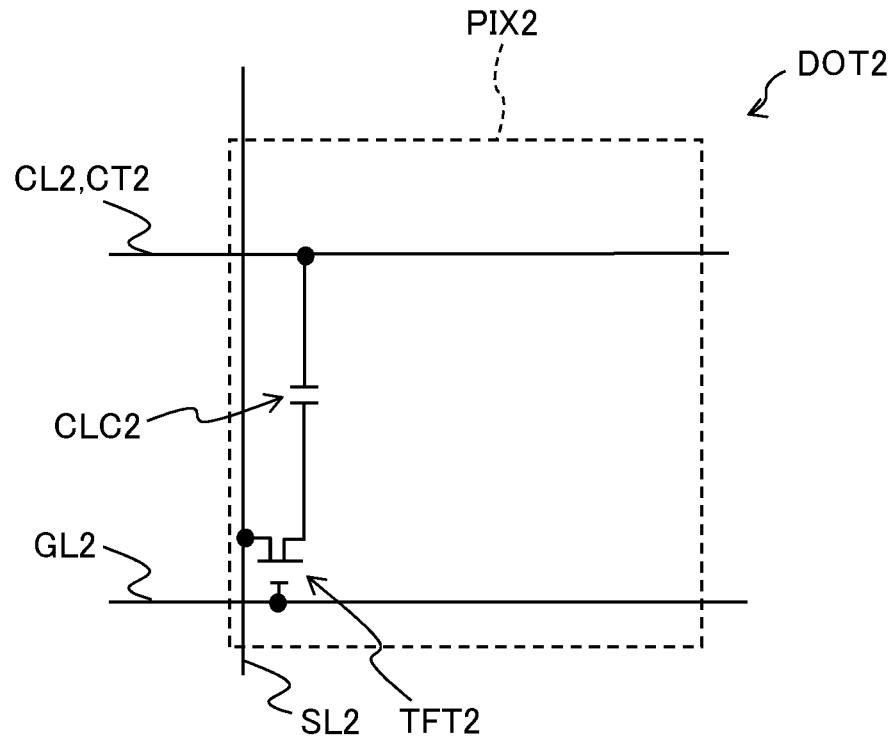
Figure 21A:
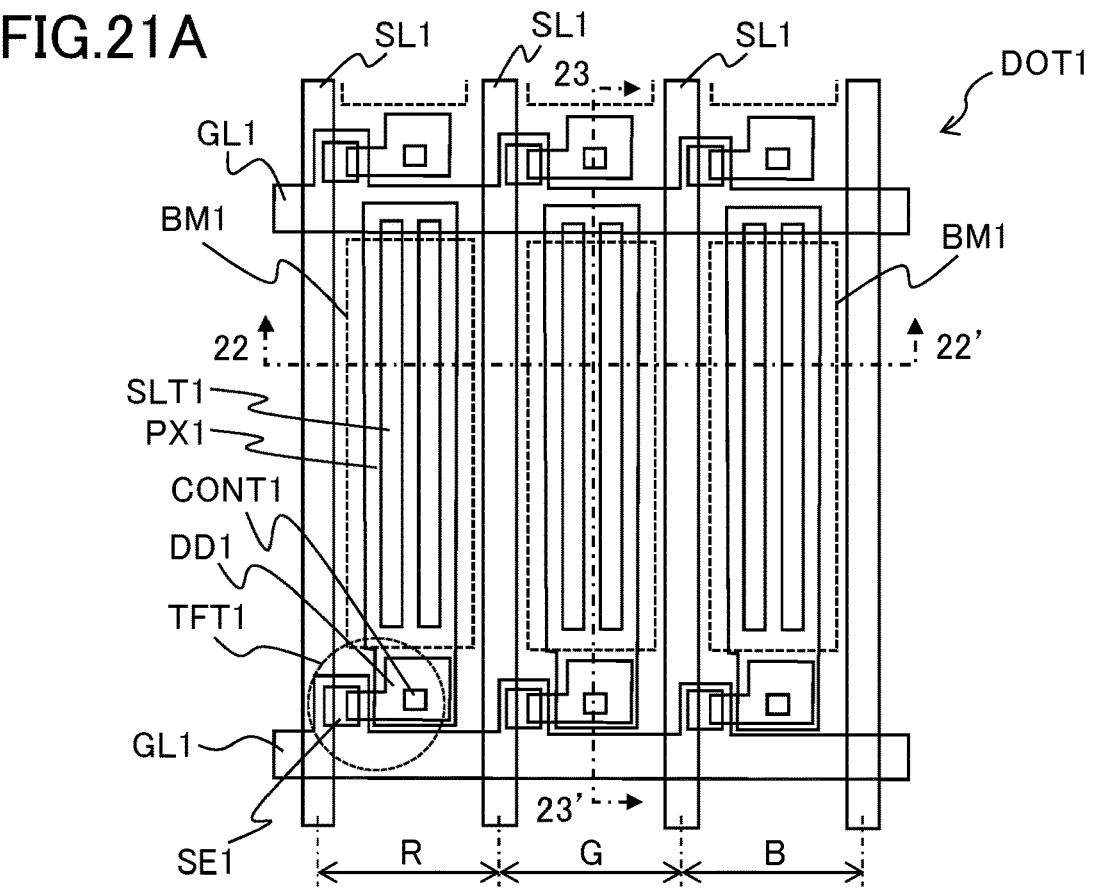
FIG. 21A is a plan view illustrating a specific configuration of pixel PIX1 illustrated in FIG.

FIGS. 20A and 20B are plan views each illustrating a relationship between pixels PIX1 of display panel LCP1 and pixels PIX2 of display panel LCP2, pixels PIX1 and pixels PIX2 overlapping with each other in plan view. FIG. 21A is a plan view illustrating a specific configuration of pixel PIX1 illustrated in FIG. 20A, and FIG. 21B is a plan view illustrating a specific configuration of pixel PIX2 illustrated in FIG. 20B.

In the example illustrated in FIG. 20, one red pixel PIXR, one green pixel PIXG, and one blue pixel PIXB of display panel LCP1 and one pixel PIX2 of display panel LCP2 are arranged to overlap with each other in plan view. In a case where pixels PIX1 of display panel LCP1 are equal in area (size) to one another, the area of one pixel PIX2 of display panel LCP2 is three times as large as the area of one pixel PIX1 of display panel LCP1. FIG. 20A illustrates a common wire CL1 connected to a common electrode CT1, and a liquid crystal capacitor CLC1, and FIG. 20B illustrates a common wire CL2 connected to a common electrode CT2, and a liquid crystal capacitor CLC2. As illustrated in FIG. 21B, slits SLT2 may be formed in pixel electrode PX2. FIG. 21B illustrates a semiconductor layer SE2 and a drain electrode DD2 which constitute thin film transistor TFT2.

Figure 21B:
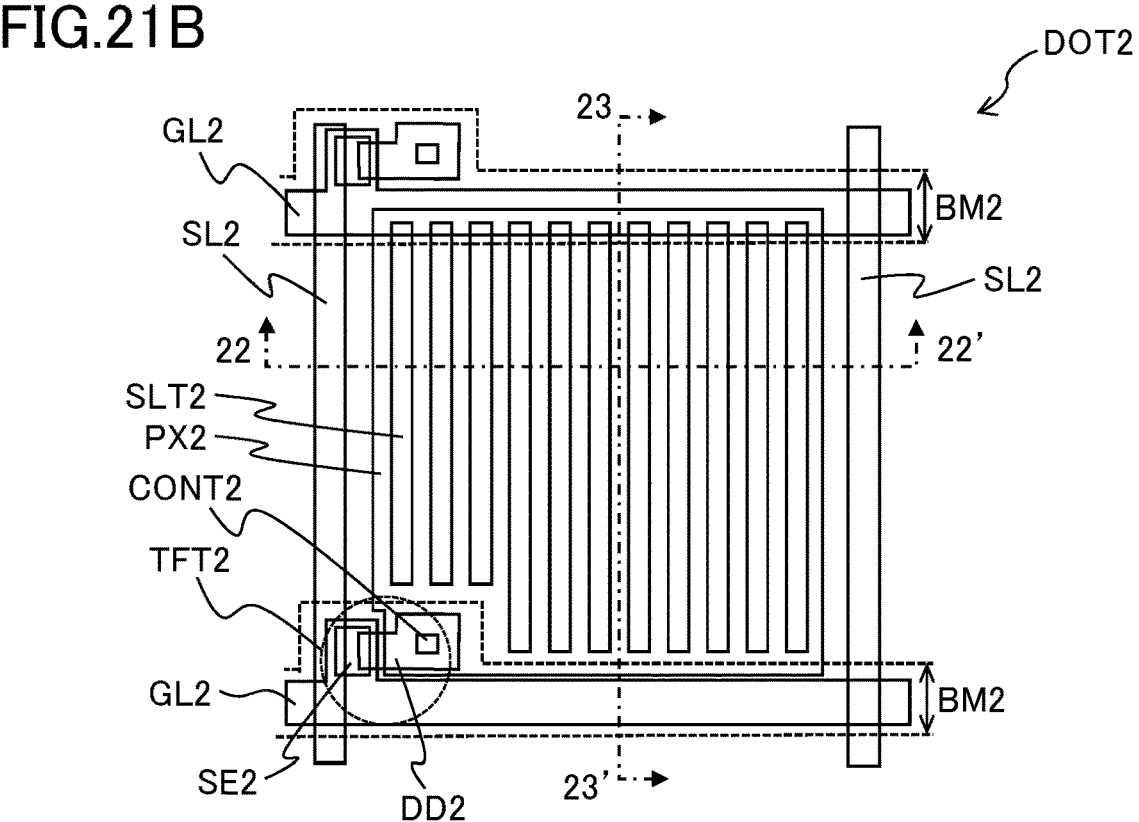
FIG. 21B is a plan view illustrating a specific configuration of pixel PIX2 illustrated in FIG. 20B.
Figure 23:
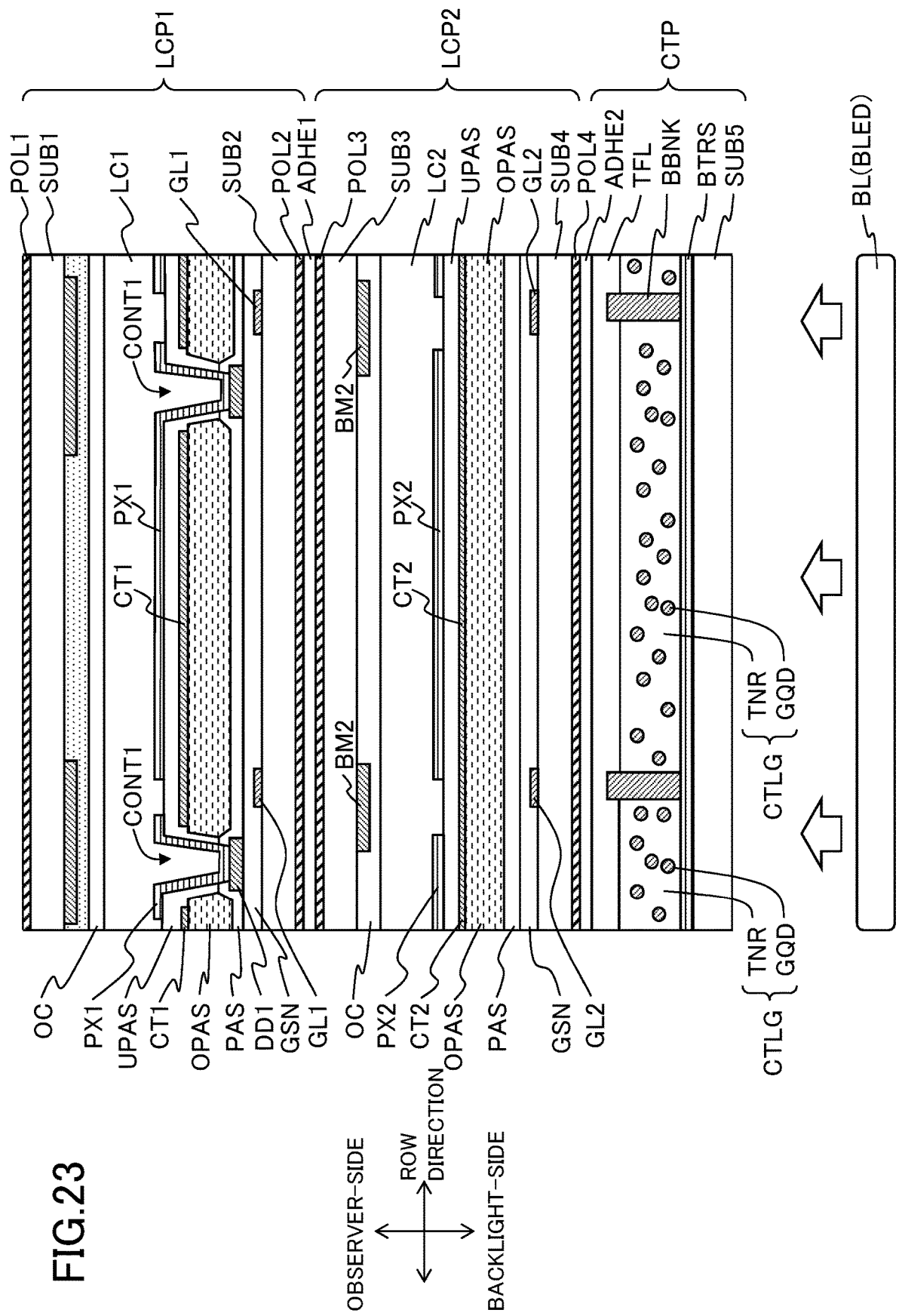
FIG. 23 is a sectional view taken along line 23-23' in FIGS. 21A and 21B.

FIG. 22 is a sectional view taken along line 22-22' in FIGS. 21A and 21B, and FIG. 23 is a sectional view taken along line 23-23' in FIGS. 21A and 21B. FIGS. 22 and 23 each illustrate sectional structures of display dots DOT1, DOT2, and DOT3, including a sectional structure of color conversion panel CTP. The structure of display dot DOT1 according to the second exemplary embodiment is the same as the structure of display dot DOT1 (see FIG. 8) according to the first exemplary embodiment, and the structure of display dot DOT3 according to the second exemplary embodiment is the same as the structure of display dot DOT2 (see FIG. 8) according to the first exemplary embodiment.

In thin film transistor substrate TFTB2 of display panel LCP2 (see FIG. 19), gate line GL2 is formed on a transparent substrate SUB4 (glass substrate), and a gate insulating film GSN is formed to cover gate line GL2. On gate insulating film GSN, semiconductor layer SE2 (see FIG. 21B) made of amorphous silicon (a-Si), source line SL2 (source electrode), and drain electrode DD2 (see FIG. 21B) are formed, and a protective film PAS and an organic insulating film OPAS are formed to cover semiconductor layer SE2, source line SL2, and drain electrode DD2. Common electrode CT2 is formed on organic insulating film OPAS, and a protective film UPAS is formed to cover common electrode CT2. Pixel electrode PX2 is formed on protective film UPAS, and an alignment film (not illustrated) is formed to cover pixel electrode PX2. Contact hole CONT2 (see FIG. 21B) is formed in protective film PAS, organic insulating film OPAS, and protective film UPAS, and a part of pixel electrode PX2 is electrically connected to drain electrode DD2 via contact hole CONT2. In counter substrate CF2 (see FIG. 19), black matrix BM2 is formed on transparent substrate SUB3 (glass substrate) so as to cover a region where thin film transistor TFT2 and gate line GL2 are formed, in plan view. Black matrix BM2 is coated with overcoat film OC, and the alignment film (not illustrated) is formed on overcoat film OC.

Liquid crystal layer LC2 is provided between thin film transistor substrate TFTB2 and counter substrate CF2. Liquid crystal layer LC2 has a configuration in which liquid crystal molecules LCB (negative type liquid crystal molecules LCBN) are contained in a nematic liquid crystal.

Color conversion panel CTP is bonded to polarizing plate POL4 of display panel LCP2 with adhesive ADHE2.

Figure 24:
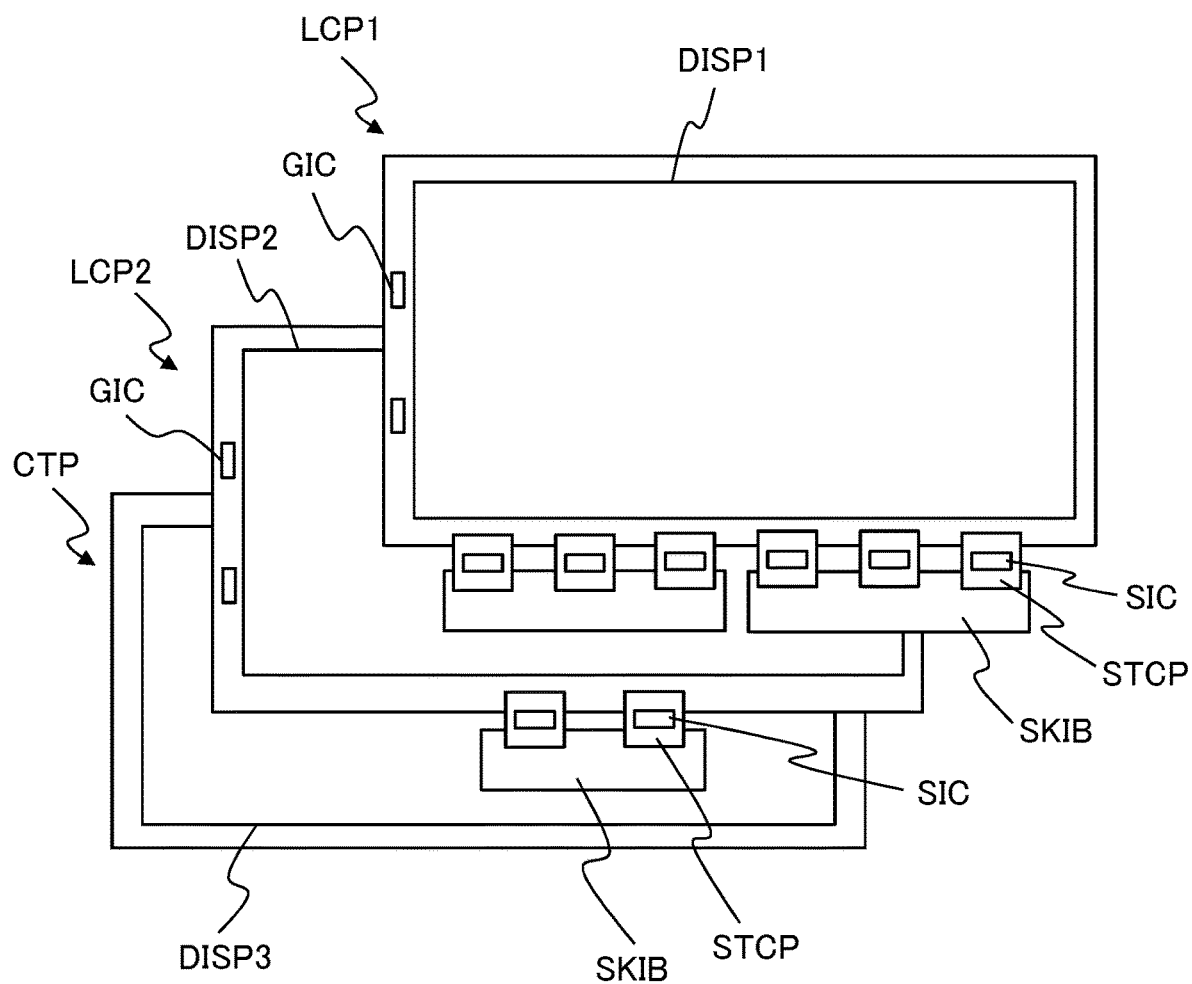
FIG. 24 is a diagram illustrating a configuration of a driver of liquid crystal display device.

FIG. 24 is a diagram illustrating a configuration of a driver of liquid crystal display device LCD. On display panel LCP1, six source driver ICs (SIC) and two gate driver ICs (GIC) are mounted. On display panel LCP2, two source driver ICs (SIC) and two gate driver ICs (GIC) are mounted.

With liquid crystal display device LCD according to the second exemplary embodiment, in a liquid crystal display device including two or more display panels, as in liquid crystal display device LCD according to the first exemplary embodiment, it is possible to reduce oblique color mixing and to improve the aperture ratio of each pixel. Note that liquid crystal display device LCD according to the second exemplary embodiment may be a liquid crystal display device LCD of an IPS method, as in liquid crystal display device LCD according to the first exemplary embodiment. In this case, each of display panel LCP1 and display panel LCP2 may be is a liquid crystal display panel of the IPS method, and liquid crystal layer LC1 and liquid crystal layer LC2 may be driven in an IPS mode.

A liquid crystal display device according to the present invention is not limited to the above-described configurations. For example, backlight BL may be configured to emit ultraviolet light. In this configuration, blue color conversion layer CTLB contains quantum dots smaller in particle size than red quantum dots RQD and green quantum dots GQD. Accordingly, backlight BL emits ultraviolet light, red color conversion layer CTLR converts the ultraviolet light into red light, green color conversion layer CTLG converts the ultraviolet light into green light, and blue color conversion layer CTLB converts the ultraviolet light into blue light. In addition, color filters FIL include red color filter FILR, green color filter FILG, and blue color filter FILB.

While there have been described what are at present considered to be certain embodiments of the application, it will be understood that various modifications may be made thereto, and it is intended that the appended claims cover all such modifications as fall within the true spirit and scope of the invention.

What is claimed is:

1. A liquid crystal display device comprising:
   a first display panel including:
      a first substrate,
      a second substrate that is disposed in a first direction with respect to the first substrate and includes a color filter, and
      a first liquid crystal layer disposed between the first substrate and the second substrate;
   a color conversion unit disposed in a second direction opposite to the first direction with respect to the first display panel;
   a backlight disposed in the second direction with respect to the color conversion unit, wherein
      the color filter includes a first color filter of a first color and a second color filter of a second color,
      a first black matrix is extended in both row and column directions and disposed at a boundary between the first color filter and the second color filter on the second substrate,
   the color conversion unit converts backlight light emitted from the backlight into light of a color corresponding to the color filter, and emits the light,
   the color conversion unit includes:
      a first color conversion layer that converts the backlight light into light of the first color;
      a second color conversion layer that converts the backlight light into light of the second color;
      a light shielding unit that is extended in both the row and column directions and disposed at a boundary between the first color conversion layer and the second color conversion layer and blocks transmission of light, and
      a third substrate on which the first color conversion layer and the second color conversion layer are formed,
      wherein the light shielding unit includes a plurality of openings, the plurality of openings has a first opening and a second opening, the first color conversion layer is located at the first opening, and the second color conversion layer is located at the second opening,
      a height of the light shielding unit is higher than a height of the first color conversion layer and the second color conversion layer,
      a width of the first black matrix disposed at the boundary between the first color filter and the second color filter is greater than a width of the light shielding unit disposed at the boundary between the first color conversion layer and the second color conversion layer; and
   a second display panel including:
      a fourth substrate,
      a fifth substrate, a second black matrix extended in the row direction and disposed on the fifth substrate, and a second liquid crystal layer disposed between the fourth and fifth substrate, wherein
         the second display panel is disposed between the first display panel and the color conversion unit,
         the second display panel has a plurality of pixels, one of the plurality of pixels corresponds to the first opening and the second opening,
         the one of the plurality of pixels is overlapped with the first opening and the second opening in planar view, and
         a portion of a data line of the second display panel extended in the column direction, which does not overlap with the second black matrix, overlaps with both the first black matrix and the light shielding unit in the planar view.

2. The liquid crystal display device according to claim 1, wherein the color conversion unit further includes:
   a band-pass filter disposed on the third substrate in the second direction with respect to the first color conversion layer, the second color conversion layer, and the light shielding unit, the band pass filter having a property of transmitting the backlight light and of reflecting the light of the first color and the light of the second color, the band-pass filter is sandwiched with the light shielding unit and the third substrate.

3. The liquid crystal display device according to claim 2, wherein each of the first color conversion layer and the second color conversion layer includes quantum dots having different diameters from each other.

4. The liquid crystal display device according to claim 2, wherein
the backlight emits blue light, and
the first color conversion layer converts the blue light into red light, and the second color conversion layer converts the blue light into green light.

5. The liquid crystal display device according to claim 2, wherein
the backlight emits blue light,
the color conversion unit includes a red conversion layer that converts a blue light into a red light and a green conversion layer that converts the blue light into a green light, and the color filter includes a red color filter and a green color filter.

6. The liquid crystal display device according to claim 1, wherein a polarizing plate is disposed between the color conversion unit and the first display panel.

7. The liquid crystal display device according to claim 1, wherein the first display panel is an IPS type liquid crystal display panel.

8. The liquid crystal display device according to claim 1,
wherein the first display panel displays a color image and the second display panel displays a black-and-white image.

9. The liquid crystal display device according to claim 8, wherein the first display panel and the second display panel are an IPS type liquid crystal display panel.

10. The liquid crystal display device according to claim 1, wherein
the plurality of openings further has a third opening, the third opening corresponds to a blue, the first opening corresponds to a red, and the second opening corresponds to a green, and
the one of the plurality of pixels are overlapped with the first opening, the second opening and the third opening in planar view.

* * * * *